US012629595B2

(12) United States Patent
Bao

(10) Patent No.: US 12,629,595 B2
(45) Date of Patent: May 19, 2026

(54) METHOD, COMPUTER DEVICE, AND STORAGE MEDIUM FOR VIRTUAL OBJECT SWITCHING

(71) Applicant: TENCENT TECHNOLOGY (SHENZHEN) COMPANY LIMITED, Shenzhen (CN)

(72) Inventor: Huifei Bao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 282 days.

(21) Appl. No.: 18/352,607

(22) Filed: Jul. 14, 2023

(65) Prior Publication Data

US 2023/0356075 A1 Nov. 9, 2023

Related U.S. Application Data

(63) Continuation of application No. PCT/CN2022/127014, filed on Oct. 24, 2022.

(30) Foreign Application Priority Data

Dec. 10, 2021 (CN) .......................... 202111506115.4

(51) Int. Cl.
*A63F 13/533* (2014.01)
*A63F 13/211* (2014.01)
(Continued)

(52) U.S. Cl.
CPC .......... *A63F 13/533* (2014.09); *A63F 13/211* (2014.09); *A63F 13/426* (2014.09);
(Continued)

(58) Field of Classification Search
CPC .... A63F 13/533; A63F 13/211; A63F 13/426; A63F 13/428; A63F 13/5372; A63F 13/55; A63F 13/2145; A63F 2300/308
See application file for complete search history.

(56) References Cited

U.S. PATENT DOCUMENTS 9,901,814 B2* 2/2018 Nonaka ................... A63F 13/24
11,253,776 B2* 2/2022 Enokido ............... A63F 13/814
(Continued)

FOREIGN PATENT DOCUMENTS

CN 102265242 A 11/2011
CN 104639726 A 5/2015
(Continued)

OTHER PUBLICATIONS

Lock-on question. Gamefaqs.com. Online. 2020. Accessed through the internet. Accessed Jun. 14, 2025. <URL: https://gamefaqs.gamespot.com/boards/168653-final-fantasy-vii-remake/78593535?page=1> (Year: 2020).*
(Continued)

*Primary Examiner* — Carl V Larsen
(74) *Attorney, Agent, or Firm* — ANOVA LAW GROUP, PLLC

(57) ABSTRACT

A virtual object switching method includes displaying a first virtual object in a locked state and a second virtual object not in a locked state, the locked state indicating a locked virtual object becoming an action target of a main control virtual object; receiving a swing operation, the swing operation including an operation for swinging a body of the mobile terminal; and switching from the first virtual object in the locked state to the second virtual object to be in a locked state, when the swing operation matches the second virtual object.

20 Claims, 9 Drawing Sheets

(51) Int. Cl.

| | | |
|---|---|---|
| *A63F 13/426* | (2014.01) | |
| *A63F 13/428* | (2014.01) | |
| *A63F 13/5372* | (2014.01) | |
| *A63F 13/55* | (2014.01) | |

(52) U.S. Cl.
CPC ........ *A63F 13/428* (2014.09); *A63F 13/5372* (2014.09); *A63F 13/55* (2014.09)

(56) References Cited

U.S. PATENT DOCUMENTS

| | | | | |
|---|---|---|---|---|
| 2009/0209344 | A1* | 8/2009 | Okamura | G06F 3/0346 463/36 |
| 2009/0325660 | A1* | 12/2009 | Langridge | A63F 13/45 463/2 |
| 2010/0099492 | A1 | 4/2010 | Kamiya | |
| 2010/0273544 | A1* | 10/2010 | Koganezawa | A63F 13/5375 463/2 |
| 2010/0302238 | A1* | 12/2010 | Yonemori | A63F 13/45 345/419 |
| 2012/0056801 | A1* | 3/2012 | Bevilacqua | G06F 3/0346 345/156 |
| 2013/0166397 | A1 | 6/2013 | Byun et al. | |
| 2013/0265225 | A1 | 10/2013 | Nasiri et al. | |
| 2015/0091941 | A1 | 4/2015 | Das et al. | |
| 2015/0123897 | A1* | 5/2015 | Takahagi | A63H 30/04 345/156 |
| 2016/0259420 | A1* | 9/2016 | Kim | G06F 3/017 |
| 2017/0348592 | A1* | 12/2017 | Tanaka | A63F 13/428 |
| 2018/0001189 | A1* | 1/2018 | Tang | A63F 13/42 |
| 2018/0314536 | A1 | 11/2018 | Wang et al. | |
| 2019/0336853 | A1 | 11/2019 | Tang et al. | |
| 2019/0366214 | A1* | 12/2019 | Pan | A63F 13/426 |
| 2020/0324195 | A1 | 10/2020 | Enokido et al. | |
| 2021/0049360 | A1* | 2/2021 | Yildiz | G02B 27/017 |
| 2021/0339134 | A1* | 11/2021 | Knoppert | A63F 13/26 |
| 2021/0349591 | A1 | 11/2021 | Li | |
| 2022/0379205 | A1* | 12/2022 | Corvi | A63F 13/358 |

FOREIGN PATENT DOCUMENTS

| | | | |
|---|---|---|---|
| CN | 104699399 | A | 6/2015 |
| CN | 105302434 | A | 2/2016 |
| CN | 108144293 | A | 6/2018 |
| CN | 109917995 | A | 6/2019 |
| CN | 109933267 | A | 6/2019 |
| CN | 110420462 | A | 11/2019 |
| CN | 111298438 | A | 6/2020 |
| CN | 111338487 | A | 6/2020 |
| CN | 111589130 | A | 8/2020 |
| CN | 111773656 | A | 10/2020 |
| CN | 112057862 | A | 12/2020 |
| CN | 112221139 | A | 1/2021 |
| CN | 112263830 | A | 1/2021 |
| CN | 112402977 | A | 2/2021 |
| CN | 112691375 | A | 4/2021 |
| CN | 113398565 | A | 9/2021 |
| CN | 114130023 | A | 3/2022 |
| JP | 2010252932 | A | 11/2010 |
| JP | 2012100810 | A | 5/2012 |
| JP | 2013134494 | A | 7/2013 |
| JP | 2013175208 | A | 9/2013 |
| JP | 2015111404 | A | 6/2015 |
| JP | 2016220846 | A | 12/2016 |
| JP | 2016220847 | A | 12/2016 |
| JP | 2016539668 | A | 12/2016 |
| JP | 6137718 | B1 | 5/2017 |
| JP | 2018524060 | A | 8/2018 |
| JP | 2019118549 | A | 7/2019 |
| JP | 2019162355 | A | 9/2019 |
| JP | 2020188985 | A | 11/2020 |
| JP | 2020188986 | A | 11/2020 |
| KR | 20180111838 | A | 10/2018 |

OTHER PUBLICATIONS

The Japan Patent Office (JPO) Notice of Reasons for Refusal for Application No. 2024-518461 Jan. 8, 2025 10 Pages (including translation).

The World Intellectual Property Organization (WIPO) International Search Report for PCT/CN2022/127014 Jan. 17, 2023 13 Pages (including translation).

China National Intellectual Property Administration (CNIPA) Office Action 1 for Application No. 202111506115.4 May 30, 2025 13 Pages (including translation).

* cited by examiner

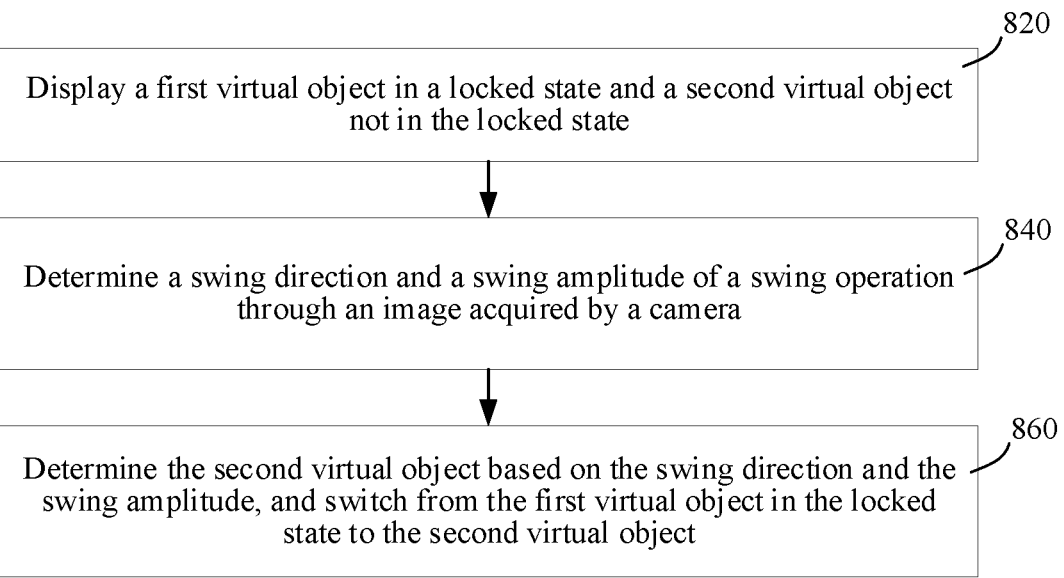

820

Display a first virtual object in a locked state and a second virtual object
not in the locked state

840

Determine a swing direction and a swing amplitude of a swing operation
through an image acquired by a camera

860

Determine the second virtual object based on the swing direction and the
swing amplitude, and switch from the first virtual object in the locked
state to the second virtual object

FIG. 8

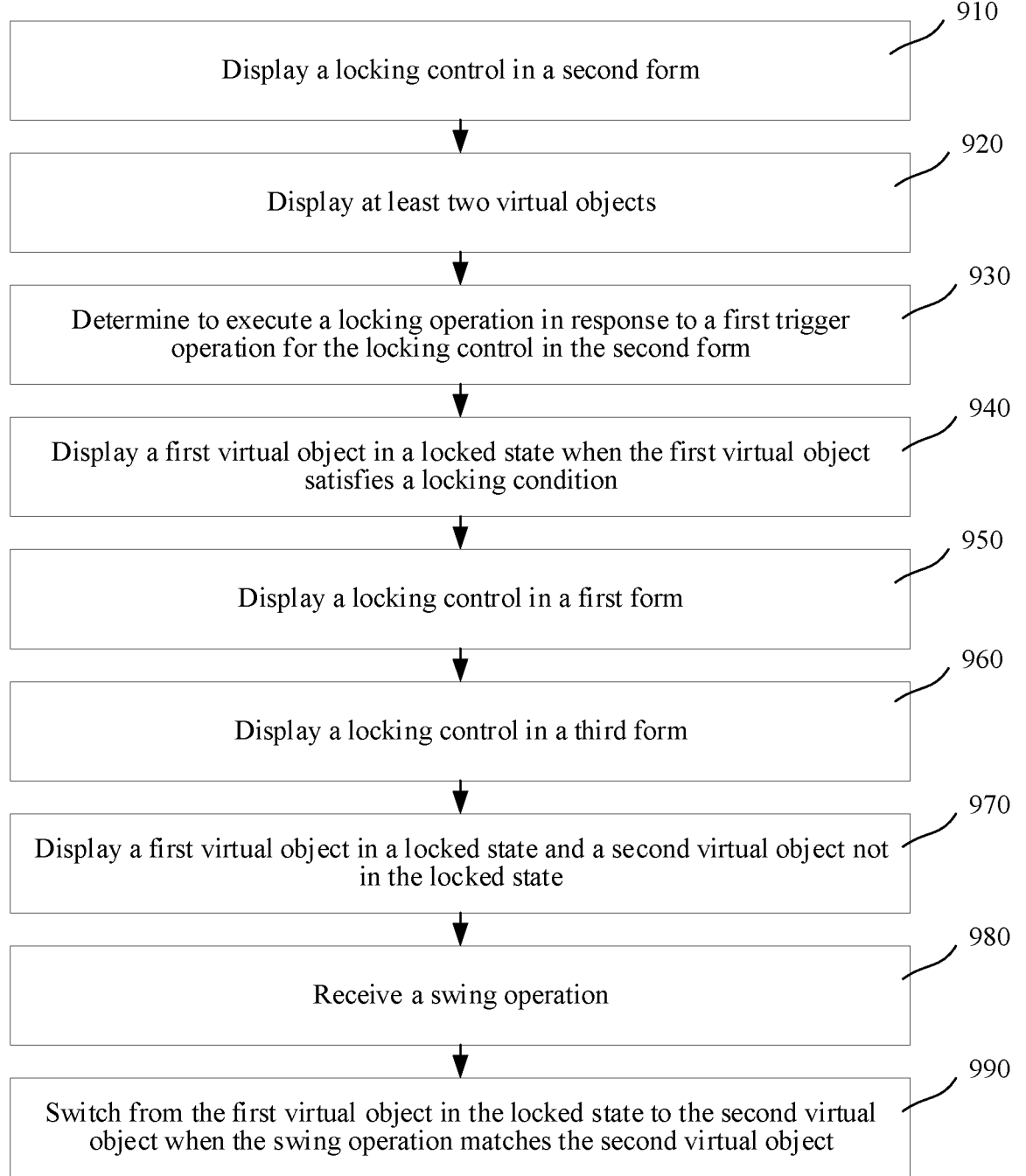

910

Display a locking control in a second form

920

Display at least two virtual objects

930

Determine to execute a locking operation in response to a first trigger operation for the locking control in the second form

940

Display a first virtual object in a locked state when the first virtual object satisfies a locking condition

950

Display a locking control in a first form

960

Display a locking control in a third form

970

Display a first virtual object in a locked state and a second virtual object not in the locked state

980

Receive a swing operation

990

Switch from the first virtual object in the locked state to the second virtual object when the swing operation matches the second virtual object

FIG. 9

METHOD, COMPUTER DEVICE, AND STORAGE MEDIUM FOR VIRTUAL OBJECT SWITCHING

CROSS-REFERENCES TO RELATED APPLICATIONS

This application is a continuation application of PCT Patent Application No. PCT/CN2022/127014, filed on Oct. 24, 2022, which claims priority to Chinese Patent Application No. 202111506115.4, filed on Dec. 10, 2021, the content of all of which is incorporated by reference in their entirety.

FIELD OF THE TECHNOLOGY

The present disclosure relates to the technical field of virtual environments and, in particular, to a virtual object switching method and apparatus, a device, a medium, and a program product.

BACKGROUND OF THE DISCLOSURE

In various games, users attack one enemy character locked among a plurality of enemy characters, and during the battle, the users often need to switch the locked enemy characters.

A locking control is often provided on a user interface (UI). When the user touches the locking control for the first time, the terminal automatically locks a first enemy character from a plurality of enemy characters. When the user touches the locking control again, the terminal switches the first enemy character to a second enemy character for locking according to a preset switching order.

However, when switching locked enemy characters, the enemy characters are only able to be switched according to the preset switching order. If the user wants to attack an enemy character who is at the end of the switching order, the user must touch the locking control repeatedly for the switching, which leads to low efficiency of character switching.

SUMMARY

According to one aspect of the present disclosure, a virtual object switching method is provided. The method is performed by a mobile terminal. The method includes displaying a first virtual object in a locked state and a second virtual object not in a locked state, the locked state indicating a locked virtual object becoming an action target of a main control virtual object; receiving a swing operation, the swing operation including an operation for swinging a body of the mobile terminal; and switching from the first virtual object in the locked state to the second virtual object to be in a locked state, when the swing operation matches the second virtual object.

According to another aspect of the present disclosure, a computer device is provided. The computer device includes a processor and a memory, the memory storing a computer program, and the computer program being loaded and executed by the processor to implement a virtual object switching method. The method includes displaying a first virtual object in a locked state and a second virtual object not in a locked state, the locked state indicating a locked virtual object becoming an action target of a main control virtual object; receiving a swing operation, the swing operation including an operation for swinging a body of the mobile terminal; and switching from the first virtual object in the locked state to the second virtual object to be in a locked state, when the swing operation matches the second virtual object.

According to another aspect of the present disclosure, a non-transitory computer-readable storage medium is provided for storing a computer program, the computer program being loaded and executed by a processor to implement a virtual object switching method. The method includes displaying a first virtual object in a locked state and a second virtual object not in a locked state, the locked state indicating a locked virtual object becoming an action target of a main control virtual object; receiving a swing operation, the swing operation including an operation for swinging a body of the mobile terminal; and switching from the first virtual object in the locked state to the second virtual object to be in a locked state, when the swing operation matches the second virtual object.

At least the following beneficial effects are provided according to various embodiments of the present disclosure.

Virtual objects in a locked state may be switched through a swing operation, thereby avoiding switching by touching a locking control repeatedly and enabling users to quickly switch locked targets. For example, when a main control virtual character controlled by a user is fighting fiercely with a first enemy character, the user finds that a second enemy character has a short fatal flaw. The second enemy character may be defeated so long as the main control virtual character attacks the second enemy character, and the user quickly switches an originally locked virtual character (first enemy character) to the second enemy character through a swing operation, and attacks the second enemy character. Therefore, the swing operation is set to switch the locked target, thereby not only enriching the operation modes of the user, but also improving the efficiency of switching the locked target by the user and improving the strategy of games.

BRIEF DESCRIPTION OF THE DRAWINGS

FIG. 8 shows a flowchart illustrating a virtual object switching method according to another exemplary embodiment of the present disclosure.

FIG. 9 shows a flowchart illustrating a virtual object switching method according to another exemplary embodiment of the present disclosure.

3

Figure 10:
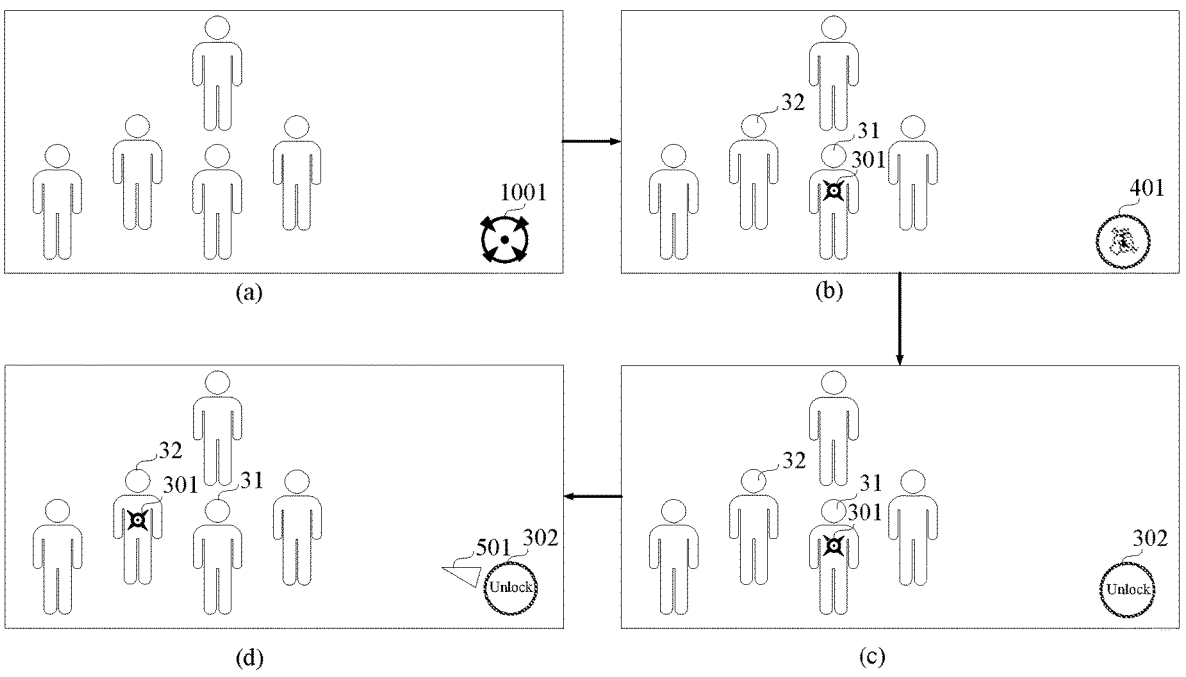

FIG. 10 shows a schematic diagram illustrating a virtual object switching process according to an exemplary embodiment of the present disclosure.

Figure 11:
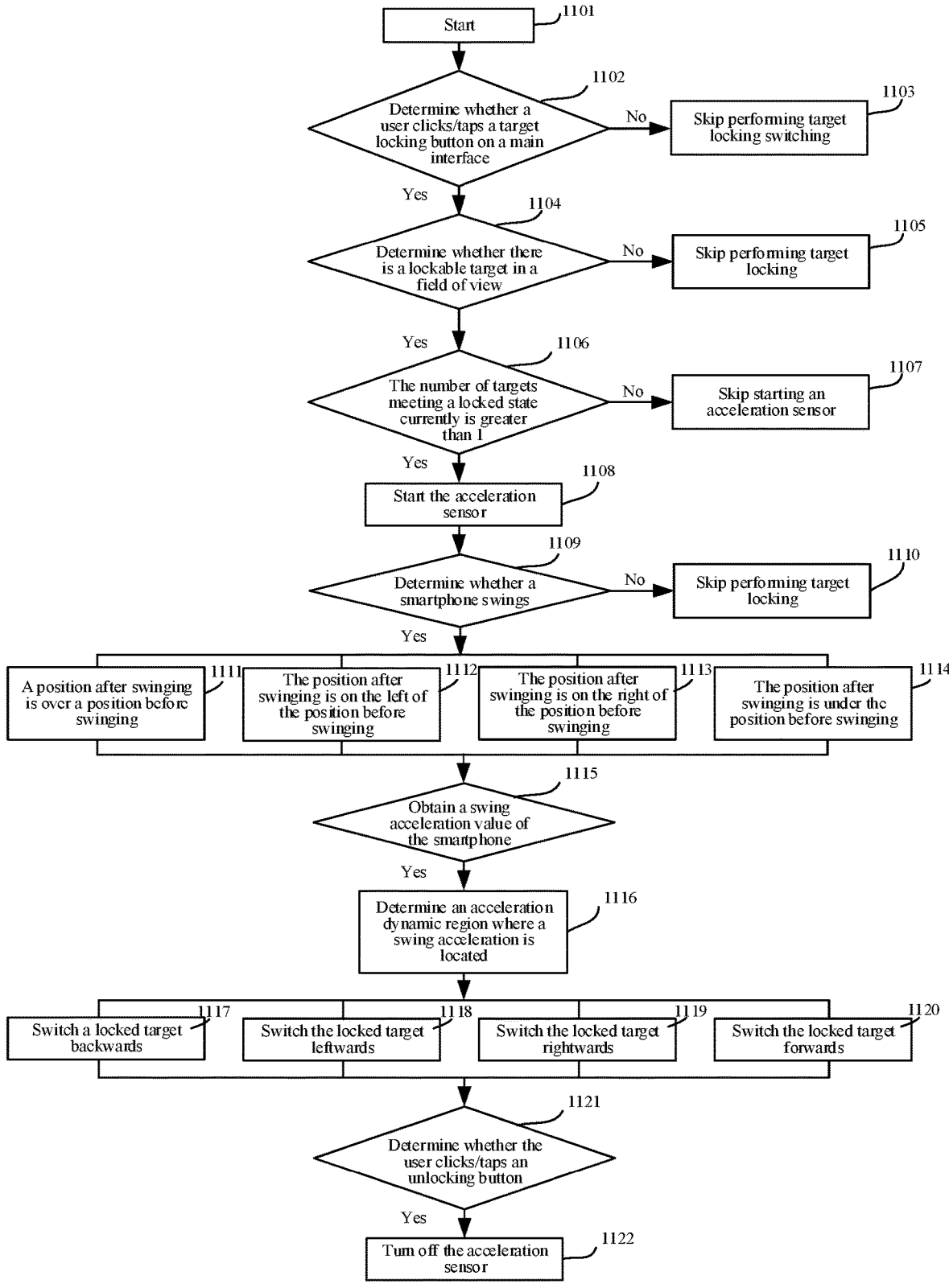

FIG. 11 shows a flowchart illustrating a virtual object switching method according to another exemplary embodiment of the present disclosure.

Figure 12:
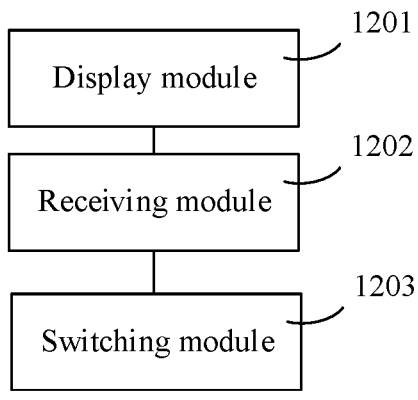

FIG. 12 shows a structural block diagram of a virtual object switching apparatus according to an exemplary embodiment of the present disclosure.

Figure 13:
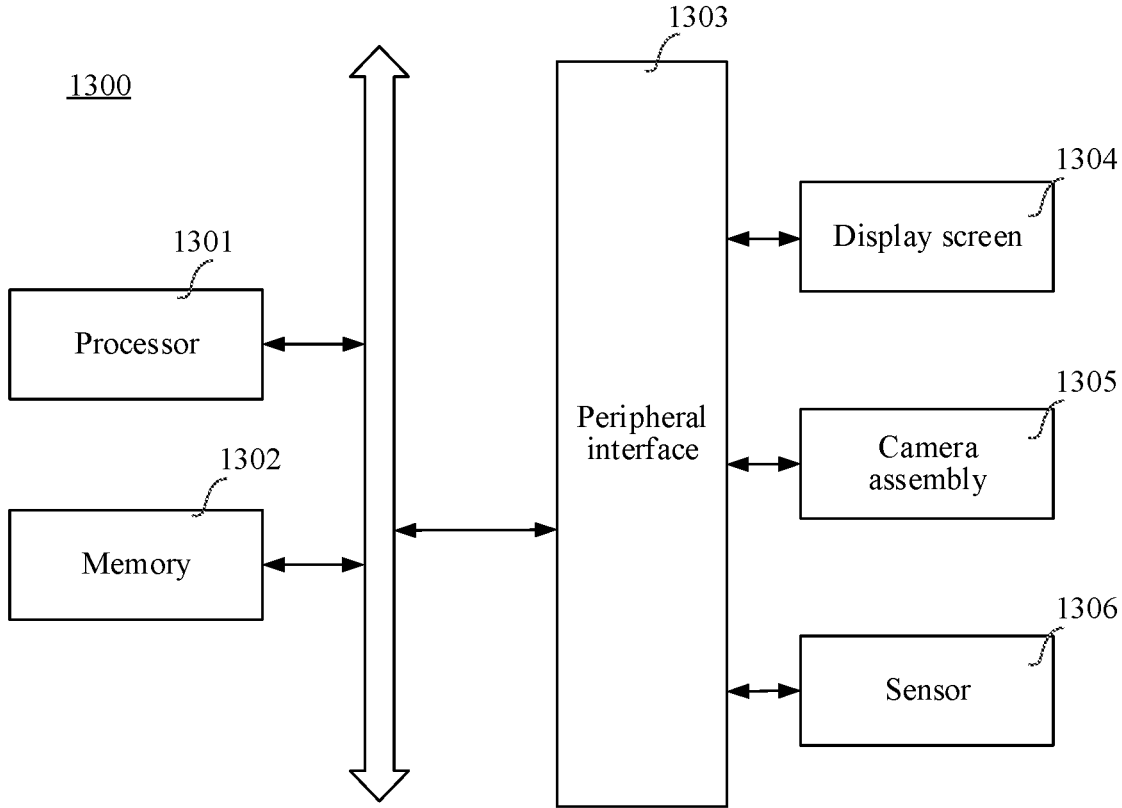

FIG. 13 shows a structural block diagram of a computer device according to an exemplary embodiment of the present disclosure.

DESCRIPTION OF EMBODIMENTS

Figure 1:
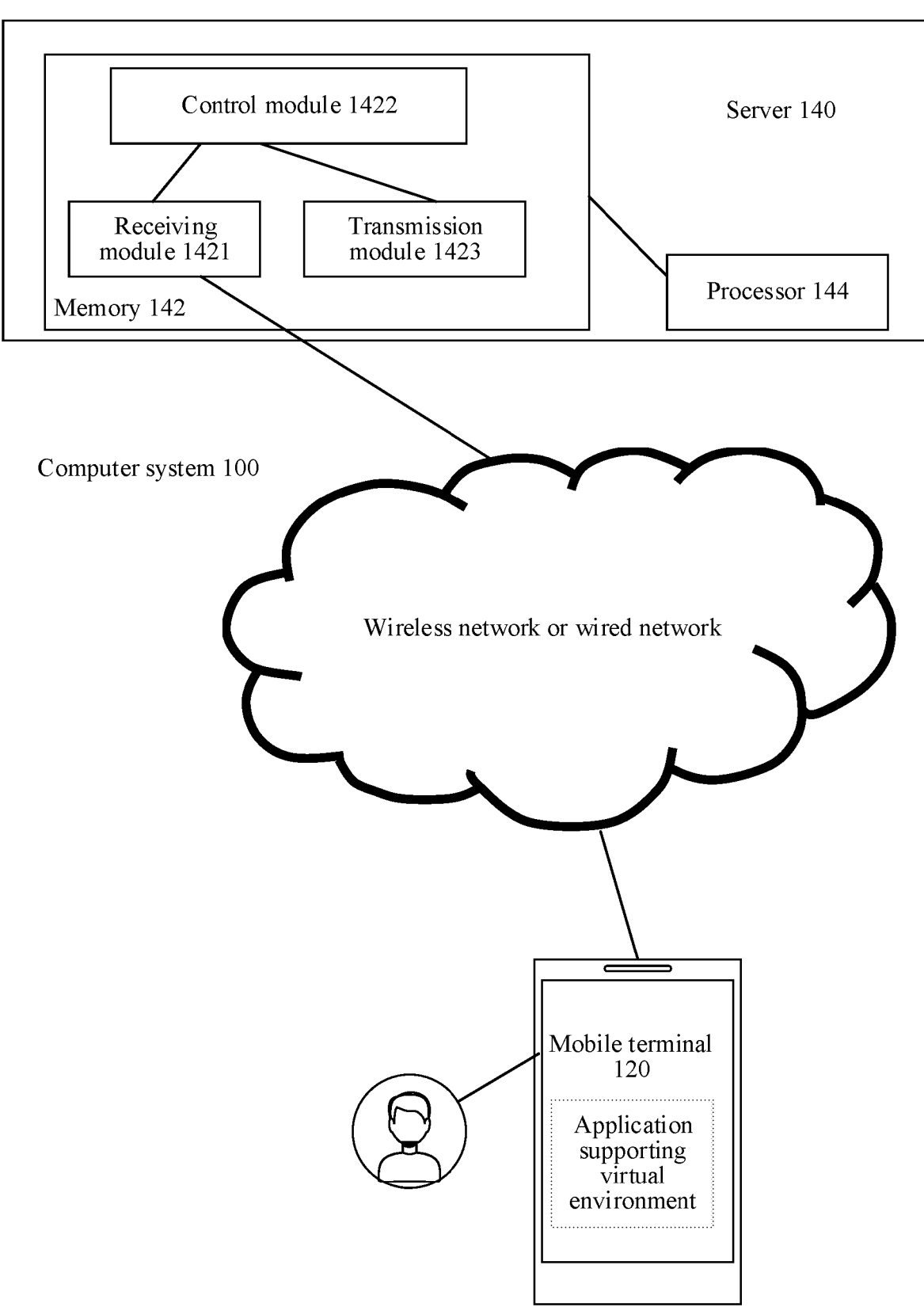
FIG. 1 shows a structural block diagram of a computer system according to an exemplary embodiment of the present disclosure.

FIG. 1 shows a structural block diagram of a computer system according to an exemplary embodiment of the present disclosure. The computer system 100 includes: a mobile terminal 120 and a server 140.

An application supporting a virtual environment is run in the mobile terminal 120. The application may be any one of three-dimensional map programs, horizontal shooting, horizontal adventure, horizontal clearance, horizontal strategies, virtual reality (VR) applications, and augmented reality (AR) programs. The mobile terminal 120 is a mobile terminal used by a user, and the user uses the mobile terminal 120 to control a main control virtual object located in a three-dimensional virtual environment to perform activities including but not limited to: at least one of adjusting body posture, walking, running, jumping, riding, driving, aiming, picking, using throwing props, and attacking other virtual objects. By way of example, the main control virtual object is a virtual character, such as a simulated character or an animated character. By way of example, the user controls the activities of the main control virtual character through a UI control on a virtual environment picture.

The mobile terminal 120 is connected to the server 140 through a wireless network or a wired network.

The server 140 includes at least one of a server, a plurality of servers, a cloud computing platform, and a virtualization center. By way of example, the server 140 includes a processor 144 and a memory 142. The memory 142 in turn includes a receiving module 1421, a control module 1422, and a transmission module 1423. The receiving module 1421 is configured to receive a request transmitted by an application, such as attacking an enemy. The control module 1422 is configured to control the rendering of the virtual environment picture. The transmission module 1423 is configured to transmit a response to the application, such as transmitting a value of damage caused by an attack to the application. The server 140 is configured to provide a background service for the application supporting the three-dimensional virtual environment. In one embodiment, the server 140 undertakes primary computing tasks, and the mobile terminal 120 undertakes secondary computing tasks. Or, the server 140 undertakes secondary computing tasks, and the mobile terminal 120 undertakes primary computing tasks.

In one embodiment, the foregoing applications are run on different operating system platforms (Android or IOS). In another embodiment, the mobile terminal 140 running the application has the same or different device types. The device type includes: at least one of a smartphone, a smart-watch, a smart TV, a vehicle-mounted mobile terminal, a wearable device, a tablet computer, an e-book reader, a moving picture experts group audio layer III (MP3) player, a moving picture experts group audio layer IV (MP4) player, and a laptop computer. The following embodiment is exemplified by the mobile terminal including a smartphone.

A person skilled in the art may know that the number of the mobile terminals may be larger or smaller. For example, there may be only one mobile terminal, or tens or hundreds of mobile terminals, or more mobile terminals. This embodiment of the present disclosure does not limit the number of mobile terminals and device types.

Figure 2:
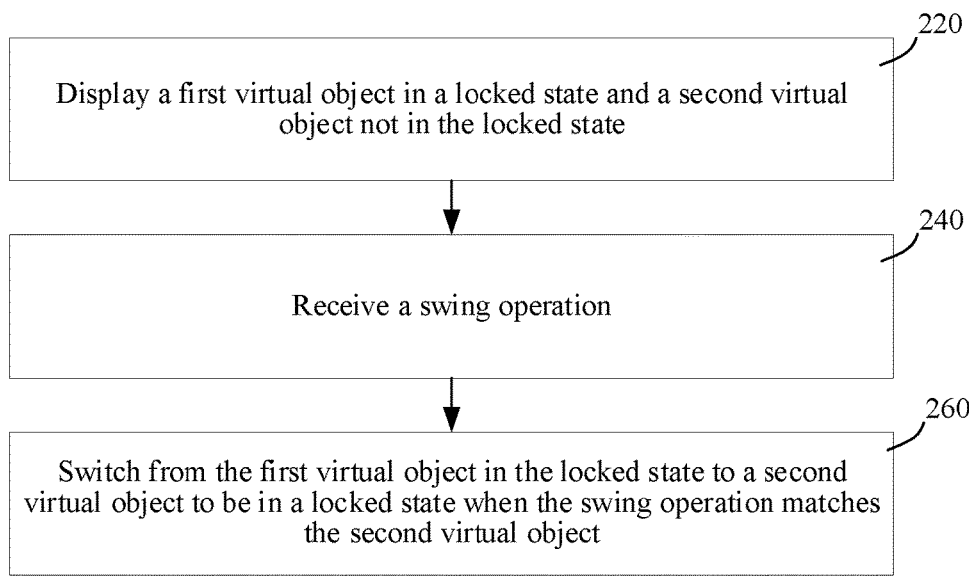
FIG. 2 shows a flowchart illustrating a virtual object switching method according to an exemplary embodiment of the present disclosure.

In order to improve the efficiency of switching a locked target, FIG. 2 shows a flowchart of a virtual object switching method according to an exemplary embodiment of the present disclosure. The method is exemplified by being applied to the mobile terminal 120 (or the application on the mobile terminal 120) shown in FIG. 1. The method includes the following steps:

Step 220: Display a first virtual object in a locked state and a second virtual object not in the locked state.

Locked State: The locked state indicates a locked virtual object becoming an action target of a main control virtual object. The locked virtual object may then be attacked by the main control virtual object. For example, the main control virtual object slashes, fires, casts throwing objects, and casts attack skills to the locked virtual object. Or, the main control virtual object may move toward the locked virtual object, and a position of the locked virtual object is a destination of the main control virtual object. Or, the main control virtual object obtains detailed information of the locked virtual object. For example, after the locked virtual object, a screen of the mobile terminal displays the detailed description of the locked virtual object "Artillery [Level 5] Attack 80 Defense 50". In the present disclosure, the locked state only indicates a locked virtual object becoming an action target of a main control virtual object. A specific action of the main control virtual object for the locked virtual object is not limited in the present disclosure.

Main Control Virtual Object: The main control virtual object is a virtual object of the mobile terminal that has a control permission. The main control virtual object may execute, under the control of the mobile terminal, at least one of adjusting body posture, walking, running, jumping, riding, driving, aiming, picking, using throwing props, and attacking other virtual objects. The main control virtual object may be a virtual character object controlled by a user in a game, a virtual pet object summoned by the user in the game, and a virtual vehicle object used by the user in the game.

First Virtual Object: The first virtual object is a virtual object having an activity ability in a virtual environment. In one embodiment, the first virtual object is a virtual object controlled by other users, or the first virtual object is a non-player character (NPC). A second virtual object is also a virtual object having an activity ability in the virtual environment. The first virtual object and the second virtual object are only used for distinguishing different virtual objects. That is, in one embodiment, the first virtual object is a virtual object (or NPC) controlled by other users and the second virtual object is an NPC (or a virtual object controlled by other users). In another embodiment, both the first virtual object and the second virtual object are virtual objects controlled by other users. Or, the first virtual object and the second virtual object are both NPCs.

In many games, there may be two locking modes: active locking and passive locking. The active locking refers to that the user actively controls the main control virtual object to lock a virtual object, while the passive locking refers to locking a virtual object according to preset locking rules. For example, the user actively selects a virtual object from a plurality of surrounding virtual objects to attack, which is called the active locking. After the main control virtual object controlled by the user is attacked by a certain virtual object in the surrounding virtual objects, the virtual object is passively taken as a next attack target, that is, the passive locking. The user may switch between the active locking and the passive locking by corresponding operations.

In the active locking mode, an interface of the mobile terminal is usually provided with a locking indicator or a locking visual effect, for prompting the user of the currently locked virtual object. In the passive locking mode, the interface of the mobile terminal is usually not provided with additional prompt information. The locked virtual object may be directly observed and determined on the interface according to the specific action of the main control virtual object for the locked virtual object.

In the present disclosure, switching of a locked virtual object by a user in an active locking mode is mainly described.

In one embodiment, the mobile terminal displays a first virtual object in a locked state and a second virtual object not in the locked state. Schematically, it is indicated that the first virtual object is in the locked state on the mobile terminal by at least one of text, a locking indicator, and a locking visual effect. For example, a box (locking indicator) is added around a contour of the first virtual object to indicate successful locking of the first virtual object, a sight (locking indicator) is displayed on a torso of the first virtual object (lock indicator) to indicate successful locking of the first virtual object, the first virtual object is configured to display a blinking effect (locking visual effect), the first virtual object is configured to display a zooming effect (locking visual effect), a color (locking visual effect) different from the second virtual object is displayed on the first virtual object, and so on.

Figure 3:
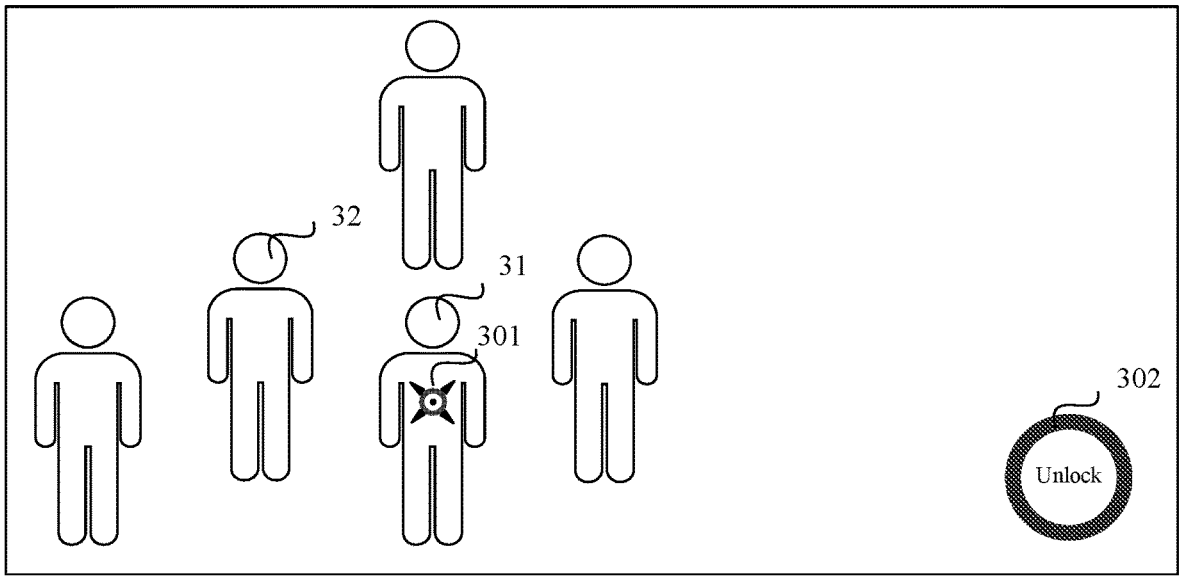
FIG. 3 shows a schematic diagram illustrating a first virtual object in a locked state and a second virtual object not in the locked state according to an exemplary embodiment of the present disclosure.

Schematically, FIG. 3 shows a schematic diagram of a first virtual object locked and a second virtual object not locked. A first virtual object 31 has a locking indicator 301, and a second virtual object 32 does not have the locking indicator 301. The locking indicator 301 indicates that the first virtual object is in a locked state, and correspondingly, the second virtual object 32 is not in the locked state.

Step 240: Receive a swing operation.

The swing operation is an operation for swinging a body of the mobile terminal. In response to the user swinging the body of the mobile terminal, the mobile terminal receives the swing operation.

In one embodiment, the mobile terminal determines that the swing operation has been received through a signal outputted from a built-in motion sensor. Schematically, the mobile terminal determines that the swing operation has been received through a signal variation value acquired by the motion sensor. The motion sensor may be at least one of an acceleration sensor, a gyro sensor, and a six-axis sensor (or a nine-axis sensor or a twelve-axis sensor) obtained by fusing the acceleration sensor and the gyro sensor.

In one embodiment, the mobile terminal determines that the swing operation has been received through a signal received by an antenna. Schematically, it is determined that the swing operation has been received through an amplitude variation value and/or a frequency variation value of the received two adjacent signals, or it is determined that the swing operation has been received through an energy variation value of the received two adjacent signals. In response to the user swinging the mobile terminal, the impedance of two adjacent signals received by the antenna in the transmission process is inconsistent, resulting in inconsistent energy of the two adjacent signals. In one embodiment, the signals received by the antenna may be wireless fidelity (wifi) signals, mobile network signals, Bluetooth signals, and the like.

In one embodiment, the mobile terminal determines that the swing operation has been received through an image acquired by a camera. Schematically, it is determined that the swing operation has been received through similarity between two adjacent frames of acquired images.

Figure 4:
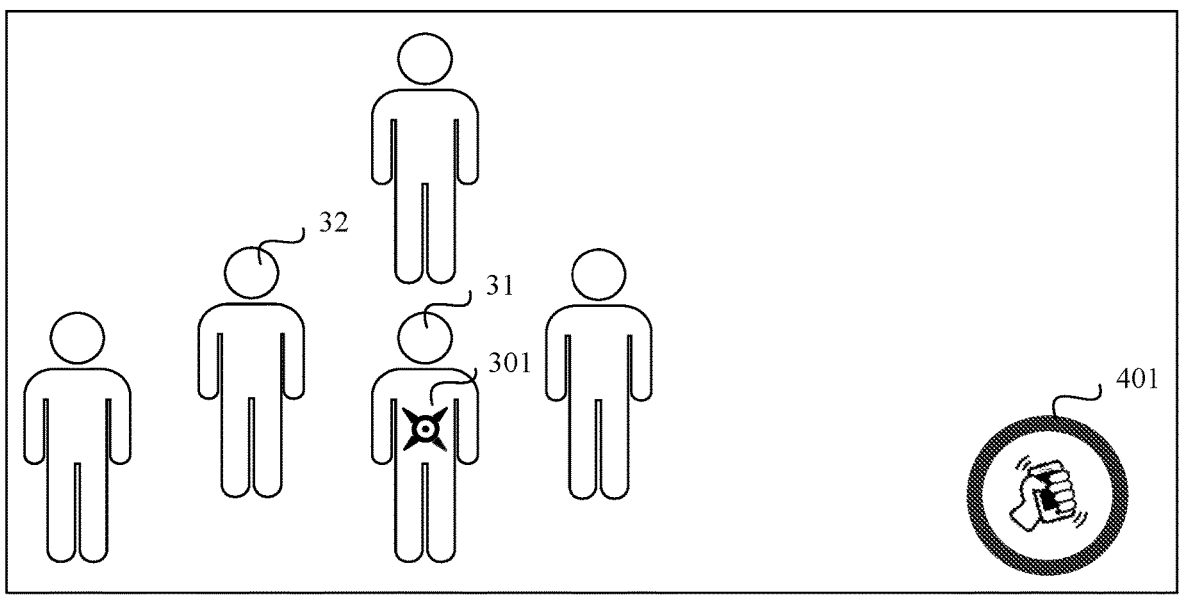
FIG. 4 shows a structural diagram illustrating prompt information of a swing operation according to an exemplary embodiment of the present disclosure.

In one embodiment, before receiving the swing operation, the screen of the mobile terminal further displays a locking control in a first form. The locking control in the first form is configured to prompt that virtual objects in the locked state are switched through the swing operation. Schematically, FIG. 4 shows a locking control 401 in a first form. A prompt pattern of "swing a mobile phone" is displayed on the locking control 401 in the first form. In one embodiment, in response to first displaying the locking control in the first form for a preset duration on the interface of the mobile terminal, as shown in FIG. 4, a locking control in a third form is displayed. As shown in FIG. 3, FIG. 3 shows a locking control 302 in the third form. The locking control 302 in the third form displays the text content of "unlock".

Step 260: Switch from the first virtual object in the locked state to the second virtual object to be in a locked state when the swing operation matches the second virtual object.

In one embodiment, the mobile terminal determines a second virtual object matched with the swing operation according to a swing direction of the swing operation obtained by the motion sensor and a maximum acceleration (swing acceleration) in a swing process. Thereafter, the mobile terminal displays that the virtual object in the locked state is switched from the first virtual object to the second virtual object.

The process in which the mobile terminal displays that the virtual object in the locked state is switched from the first virtual object to the second virtual object may be that: the mobile terminal switches from the first virtual object in the locked state to the second virtual object to be in a locked state after determining the matched second virtual object according to the swing operation (switching of virtual objects is performed by the mobile terminal). Optional, after determining the matched second virtual object according to the swing operation, the mobile terminal reports the second virtual object to a server, and the server performs the switching of the locked state and feeds back a switching result to the mobile terminal. Correspondingly, the mobile terminal may display the second virtual object in the locked state and the first virtual object in an unlocked state according to the switching result.

In one embodiment, the mobile terminal determines that the swing operation has been received according to sudden variation of a waveform of the signal received by the antenna. The swing direction is determined according to a variation situation of the waveform after and before the sudden variation. A swing amplitude of the swing operation is determined according to an energy variation value of the signal before and after the sudden variation of the waveform. The mobile terminal determines the second virtual object according to the swing direction and the swing amplitude.

In one embodiment, the mobile terminal determines the swing direction and the swing amplitude of the swing operation according to an image acquired by the camera at a start moment of the swing operation and an image acquired at an end moment of the swing operation, and may further determine the second virtual object according to the swing direction and the swing amplitude. The mobile terminal displays that the virtual object in the locked state is switched from the first virtual object to the second virtual object.

In one embodiment, the process in which the mobile terminal displays that the virtual object in the locked state is switched from the first virtual object to the second virtual object includes at least one of the following manners:

Display a locking indicator on the second virtual object, and cancel displaying the locking indicator on the first virtual object.

Display a locking visual effect on the second virtual object, and cancel displaying the locking visual effect on the first virtual object.

Display prompt information, the prompt information being used for indicating a swing direction of the swing operation. That is, prompt information of the mobile terminal in the swing direction of the swing operation is displayed, and representations of the prompt information include at least one of graph, arrow, and text.

Figure 5:
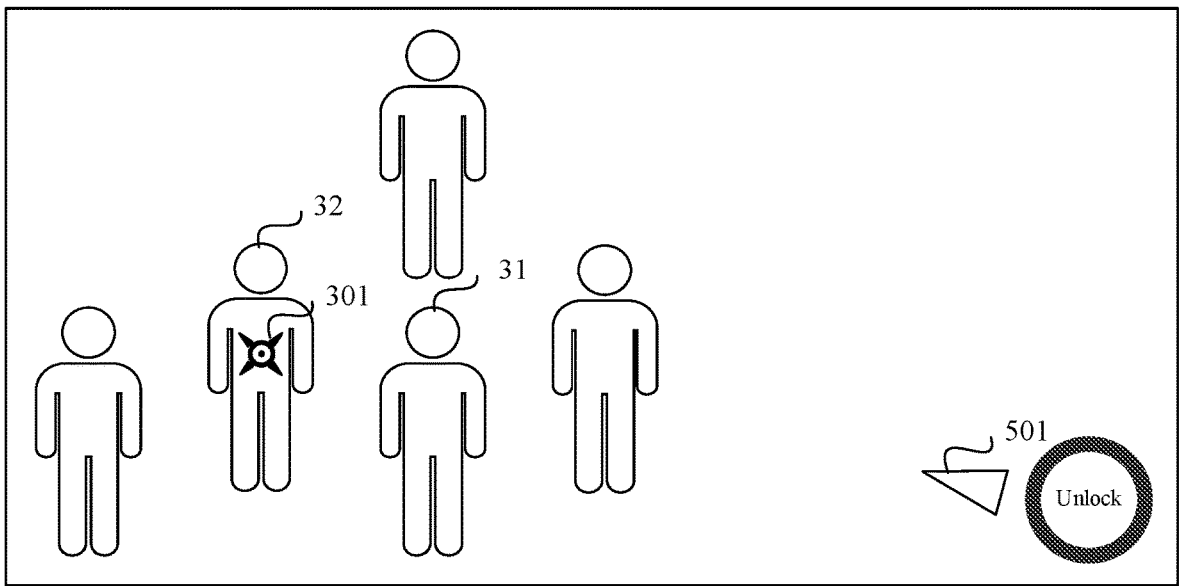
FIG. 5 shows a structural diagram illustrating prompt information of a swing direction according to an exemplary embodiment of the present disclosure.

Schematically, FIG. 5 shows an interface in which a mobile terminal switches a virtual object in a locked state from a first virtual object to a second virtual object. With reference to FIG. 3, it can be seen that the position of the locking indicator 301 is shifted from the first virtual object 31 to the second virtual object 32. FIG. 5 also shows an isosceles triangle 501. Two waist sides of the isosceles triangle 501 are longer than a third side, and the isosceles triangle 501 is used for indicating the swing direction of the swing operation. In this case, the swing direction is left.

To sum up, virtual objects in a locked state may be switched through a swing operation, thereby avoiding switching by touching a locking control repeatedly and enabling users to quickly switch locked targets. For example, when a main control virtual character controlled by a user is fighting fiercely with a first enemy character, the user finds that a second enemy character has a short fatal flaw. The second enemy character may be defeated so long as the main control virtual character attacks the second enemy character, and the user switches an originally locked virtual character (first enemy character) to the second enemy character through a swing operation, and attacks the second enemy character. Therefore, the swing operation is set to switch the locked target, thereby not only enriching the operation modes of the user, but also improving the efficiency of switching the locked target by the user and improving the strategy of games.

Figure 6:
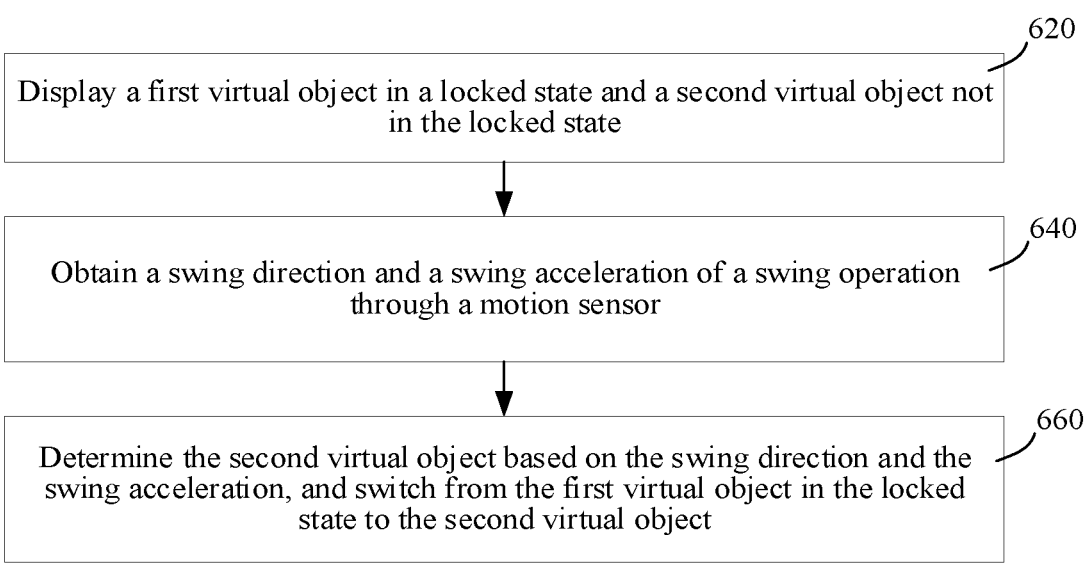
FIG. 6 shows a flowchart illustrating a virtual object switching method according to another exemplary embodiment of the present disclosure.

In order to improve the efficiency of switching a locked target, FIG. 6 shows a flowchart of a virtual object switching method according to an exemplary embodiment of the present disclosure. The method is exemplified by being applied to the mobile terminal 120 shown in FIG. 2. The method includes the following steps:

Step 620: Display a first virtual object in a locked state and a second virtual object not in the locked state.

The locked state indicates a locked virtual object becoming an action target of a main control virtual object. The main control virtual object is a virtual object of the mobile terminal that has a control permission. In one embodiment, the mobile terminal displays a first virtual object in a locked state and a second virtual object not in the locked state. Optionally, it is indicated that the first virtual object is in the locked state on the mobile terminal by at least one of text, a locking indicator, and a locking visual effect.

Step 640: Obtain a swing direction and a swing acceleration of a swing operation through a motion sensor.

The swing operation is an operation for swinging a body of the mobile terminal.

Since the swing operation may be a single swing operation or multiple swing operations, the single swing operation corresponds to a swing direction, and there may be a plurality of swing directions during the multiple swing operations. In order to avoid the influence of different swing directions on a final result during the swing operations, the swing direction in the whole swing operation process may be determined according to a start position and an end position of the mobile terminal. Correspondingly, in one embodiment, the mobile terminal obtains, through the motion sensor, a first position where the swing operation of the mobile terminal starts, and then obtains a second position where the swing operation of the mobile terminal ends. The swing direction of the swing operation executed on the mobile terminal is determined based on the first position and the second position.

Schematically, the mobile terminal obtains coordinates of the first position where the swing operation starts as $(x_1, y_1, z_1)$ by the gyro sensor, obtains coordinates of the second position where the swing operation ends as $(x_2, y_2, z_2)$ by the gyro sensor, and may determine the swing direction by coordinate vector calculation. For example, if the coordinates of the first position are $(2, 0, 0)$ and the coordinates of the second position are $(1, 0, 0)$, the swing direction is left.

In one embodiment, the mobile terminal may determine the swing direction according to the acceleration sensor, or the six-axis sensor (or the nine-axis sensor or the twelve-axis sensor) obtained by fusing the acceleration sensor and the gyro sensor.

Figure 7:
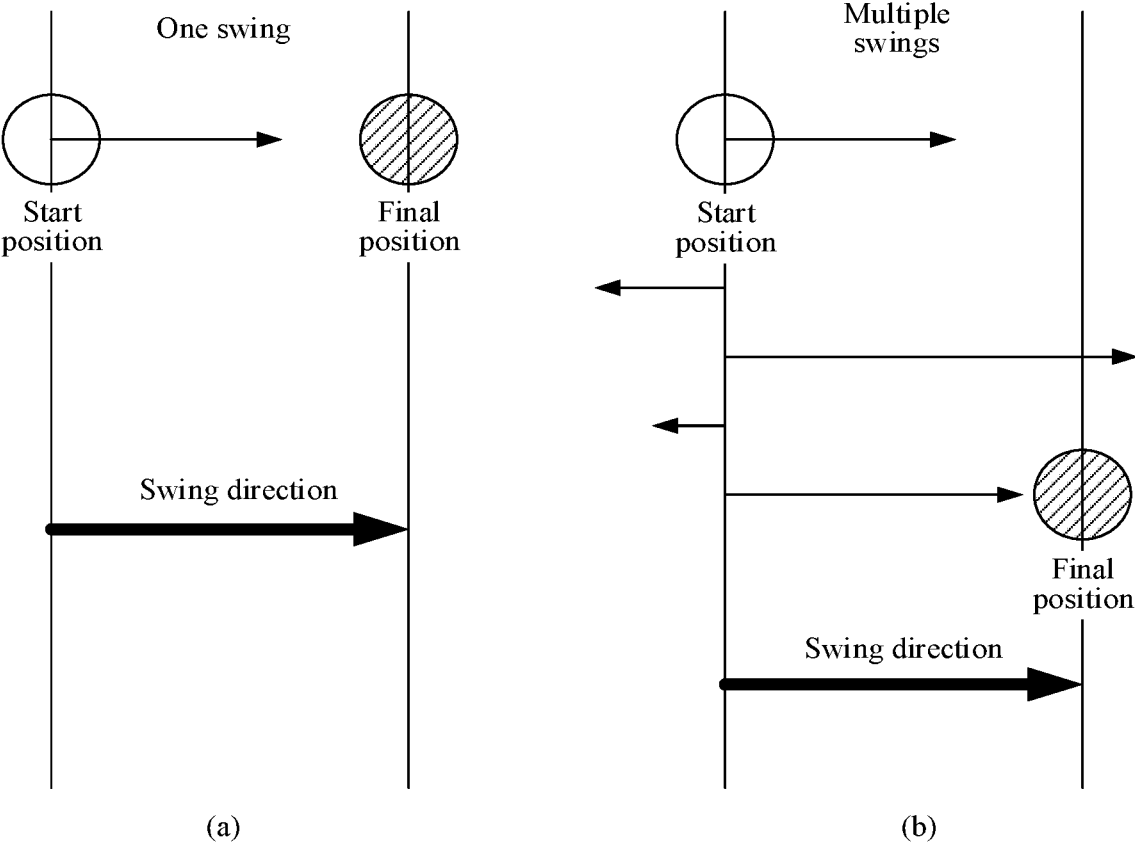
FIG. 7 shows a schematic diagram of determining a swing direction according to an exemplary embodiment of the present disclosure.

Schematically, FIG. 7(a) shows that a mobile terminal determines a swing direction based on a final position and an initial position when there is only one swing. FIG. 7(b) shows that a mobile terminal determines a swing direction based on a final position and an initial position when there are multiple swings.

In order to determine the swing direction of the mobile terminal, it is necessary to determine a start moment and an end moment of the swing operation on the mobile terminal. If the acceleration of the mobile terminal is necessarily large due to the swing operation, the start moment and the end moment may be determined according to a magnitude relationship of acceleration data acquired by the motion sensor. Correspondingly, in one embodiment, the mobile terminal obtains the acceleration through the motion sensor. When the acceleration increases from 0 and is greater than the first threshold, it is indicated that the mobile terminal is swung. Correspondingly, the mobile terminal determines a moment when the acceleration obtained through the motion sensor is greater than the first threshold as the start moment of the swing operation. Thereafter, the mobile terminal continues to obtain the acceleration through the motion sensor. When the mobile terminal determines that the acceleration decreases and is continuously smaller than the second threshold, it is indicated that the mobile terminal stops being swung. Correspondingly, the mobile terminal determines a moment when duration of the acceleration obtained through the motion sensor being smaller than the second threshold reaches a duration threshold as the end moment of the swing operation.

In one embodiment, the first threshold and the second threshold may be the same. For example, the first threshold and the second threshold may be 0 $m/s^2$. The first threshold and the second threshold may be different. For example, the first threshold may be 0 $m/s^2$, and the second threshold may be 0.2 $m/s^2$. Since the acceleration data during the swing operation is not completely the same and only a single locked virtual object needs to be determined later, a maximum acceleration during the swing operation is determined as a swing acceleration by default. Correspondingly, in one embodiment, when the mobile terminal determines the start moment and the end moment of the swing operation, the maximum value of the acceleration between the start moment and the end moment may be determined as the swing acceleration of the swing operation.

Schematically, the mobile terminal obtains the acceleration according to the acceleration sensor, or the six-axis sensor (or the nine-axis sensor or the twelve-axis sensor) obtained by fusing the acceleration sensor and the gyro sensor.

Based on the foregoing, the mobile terminal obtains the swing direction and the swing acceleration of the swing operation.

Step 660: Determine the second virtual object based on the swing direction and the swing acceleration, and switch from the first virtual object in the locked state to the second virtual object to be in a locked state.

In the process of determining the second virtual object based on the swing direction and the swing acceleration, a reference object is often needed. For example, if the swing direction is left, the second virtual object is on the left of the reference object. Based on a switching scene of this embodiment, if a user wants to switch the first virtual object in the locked state to another virtual object, it is indicated that a to-be-switched virtual object may be on the left of the first virtual object when the swing direction is left. Therefore, in one embodiment, the mobile terminal determines a first object number of candidate virtual objects in the swing direction of the first virtual object when the first virtual object is a reference position in a virtual environment. The first object number may be represented by n, and the value of n may be a positive integer.

In one embodiment, there may be one or more candidate virtual objects in the swing direction of the first virtual object. That is, the value of n may be 1 or 3. Correspondingly, it is indicated that the candidate virtual object is a to-be-switched second virtual object when the first object number is equal to 1 (when the value of n is equal to one), and then the mobile terminal may directly determine the candidate virtual object in the swing direction as the second virtual object. In one embodiment, when the first object number is greater than 1 (when the value of n is greater than one), the to-be-switched second virtual object cannot be determined according to the swing direction, and it is further necessary to screen out the second virtual object from a plurality of candidate virtual objects according to the swing acceleration. Correspondingly, the mobile terminal determines the second virtual object from n candidate virtual objects in the swing direction based on the maximum value of the acceleration in the swing process.

In one embodiment, the mobile terminal may set n acceleration intervals in the swing direction when the first object number is greater than 1 (when the value of n is greater than one). Different acceleration intervals correspond to positions of different candidate virtual objects. Then, there are n candidate virtual objects, and n acceleration intervals are correspondingly set. Then, according to an $i^{th}$ acceleration interval in which the swing acceleration is located, a candidate virtual object corresponding to the $i^{th}$ acceleration interval is determined as the second virtual object. That is to say, the mobile terminal determines the $i^{th}$ candidate virtual object among the n virtual objects as the second virtual object when the maximum value of the swing acceleration in the swing process is in the $i^{th}$ acceleration interval. The n candidate virtual objects correspond to the n acceleration intervals one by one. The n candidate virtual objects are sorted in an ascending order according to distance from the first virtual object, and the n acceleration intervals are sorted in an ascending order according to acceleration value. n and i are positive integers.

Schematically, the swing direction obtained by the motion sensor is left, and there are two candidate virtual objects on the left of the first virtual object. The mobile terminal sets two acceleration intervals corresponding to the left side as (0, 3) and (3, +∞), and determines the $1^{st}$ virtual object on the left side of the first virtual object as the second virtual object based on the maximum value of the swing acceleration of the swing operation obtained by the motion sensor being 2.

In another embodiment, the mobile terminal obtains k preset acceleration intervals when the first object number is greater than one (the value of n is greater than one), and k is greater than n. Thereafter, a $j^{th}$ acceleration interval in which the swing acceleration is located is determined. A $j^{th}$ candidate virtual object among the n candidate virtual objects is determined as the second virtual object when the maximum value of the swing acceleration in the swing process is in the $j^{th}$ acceleration interval and j is not greater than n. An $n^{th}$ candidate virtual object among the n candidate virtual objects is determined as the second virtual object when the maximum value of the swing acceleration is in the $j^{th}$ acceleration interval (the swing acceleration is in the $j^{th}$ acceleration interval) and j is greater than n. The n candidate virtual objects are sorted in an ascending order according to distance from the first virtual object, and the k acceleration intervals are sorted in an ascending order according to acceleration value. k and j are positive integers.

Schematically, when the value of n is 3, the mobile terminal obtains eight preset acceleration intervals: (0, 3), (3, 6), (6, 9), (9, 12), (12, 15), (15, 18), (18, 21), and (21, +∞) in sequence. The second candidate virtual object on the left side of the first virtual object is determined as the second virtual object if the maximum value of the swing acceleration in the swing process is 5 (falling within the second acceleration interval). The third candidate virtual object on the left side of the first virtual object is determined as the second virtual object if the maximum value of the swing acceleration in the swing process is 14 (falling within the fifth acceleration interval).

The foregoing k acceleration intervals may be preset based on a server supporting the running of the application or may be set by the user on the application. For example, the user adjusts the sensitivity of the swing operation on the application, that is, adjusts the span of the acceleration intervals and/or the number of acceleration intervals.

Based on the foregoing, the second virtual object is determined in the virtual environment. Thereafter, the mobile terminal displays that the virtual object in the locked state is switched from the first virtual object to the second virtual object, and the suitable display mode has been described in detail in step 260 and will not be repeated herein.

To sum up, a swing direction and a swing acceleration of a swing operation are received by a motion sensor, a second virtual object is determined according to the swing direction and the swing acceleration, and a virtual object in a locked state is switched from a first virtual object to the second virtual object finally, thus providing a specific implementation for switching locked objects according to the swing operation and ensuring the high efficiency of switching the locked objects.

In order to improve the efficiency of switching a locked target, FIG. 8 shows a flowchart of a virtual object switching method according to an exemplary embodiment of the present disclosure. The method is exemplified by being applied to the mobile terminal 120 shown in FIG. 2. The method includes the following steps:

Step 820: Display a first virtual object in a locked state and a second virtual object not in the locked state.

The locked state indicates a locked virtual object becoming an action target of a main control virtual object. The main control virtual object is a virtual object of the mobile terminal that has a control permission. In one embodiment, the mobile terminal displays a first virtual object in a locked state and a second virtual object not in the locked state. In one embodiment, it is indicated that the first virtual object is in the locked state on the mobile terminal by at least one of text, a locking indicator, and a locking visual effect.

Step 840: Determine a swing direction and a swing amplitude of a swing operation through an image acquired by a camera.

In one embodiment, the mobile terminal obtains a first image acquired by the camera at the start moment of the swing operation and a second image acquired by the camera at the end moment of the swing operation through the camera. Thereafter, feature point matching is performed based on the first image and the second image to determine the swing direction of the swing operation.

In one embodiment, the mobile terminal determines the swing direction of the swing operation by performing feature point tracking on the image acquired by the camera. The feature point tracking may employ a visual odometer-based tracking algorithm which is not limited in the present disclosure. In one embodiment, the feature point tracking employs a Kanade-Lucas (KLT) optical flow tracking algorithm. In one embodiment, the feature point tracking is performed using oriented FAST and rotated BRIEF (ORB) feature descriptors based on an ORB algorithm. The present disclosure is not limited to the specific algorithm of feature point tracking.

In one embodiment, the mobile terminal acquires images through the camera and obtains similarity between two adjacent frames of images. If the similarity between the two adjacent frames of images is large, it is indicated that the mobile terminal does not swing. On the contrary, if the similarity between the two adjacent frames of images is small, it is indicated that the mobile terminal has swung. Correspondingly, the mobile terminal starts to swing when similarity between two adjacent frames of first images obtained by the camera is smaller than a third threshold, determines a previous frame in the two adjacent frames of first image as a first image, and determines a moment when the first image is obtained as the start moment of the swing operation.

Schematically, after obtaining images by the camera, the mobile terminal calculates similarity between two adjacent frames of images. The similarity between the two adjacent frames of images may be calculated according to feature points. When the number of feature points repeatedly appearing between the two adjacent frames of images is smaller than a first number threshold, the similarity between the two adjacent frames of images is considered to be smaller than the third threshold, and the previous frame in the two adjacent frames of images is determined as the first image in this case. In one embodiment, a similarity determination model may be provided. The two adjacent frames of images are inputted into the similarity determination model, the similarity between the two adjacent frames of images may be outputted, and a relationship between the similarity and the third threshold is compared. When the similarity is smaller than the third threshold, the previous frame in the two adjacent frames of images is determined as the first image, and an acquisition moment of the first image is determined as the start moment of the swing operation.

In order to avoid the error of start moment determination caused by a similarity calculation error, in one embodiment, after obtaining images through the camera, the mobile terminal determines that the similarity between two adjacent frames of images is smaller than the third threshold, and then a counter is added by 1. If the mobile terminal determines that the similarity between other two adjacent frames of images is also smaller than the third threshold within a first preset duration, the counter is added by 1 again. If the accumulated value of the counter reaches a preset value within a second preset duration, it is determined that the swing operation is detected, and the previous frame of image in the two adjacent frames of images initially reaching the third threshold is determined as the first image.

In one embodiment, when the mobile terminal determines that the similarity between two adjacent frames of images is small, it is indicated that the mobile terminal stops being swung. Correspondingly, the mobile terminal determines, when the similarity between two adjacent frames of second images obtained by the camera is greater than a fourth threshold, a following frame in the two adjacent frames of second images as the second image, and determines a moment when the second image is obtained as the end moment of the swing operation. The moment when the second image is obtained is an acquisition moment of the second image.

Schematically, after obtaining images by the camera, the mobile terminal calculates similarity between two adjacent frames of images. In one embodiment, when the number of feature points repeatedly appearing between the two adjacent frames of images is greater than a second number threshold, the similarity between the two adjacent frames of images is considered to be smaller than the fourth threshold, and the following frame in the two adjacent frames of images is determined as the second image in this case. In one embodiment, the two adjacent frames of images may be inputted into the similarity determination model, the similarity between the two adjacent frames of images may be outputted, and a relationship between the similarity and the fourth threshold is compared. When the similarity is greater than the fourth threshold, the following frame in the two adjacent frames of images is determined as the second image, and an acquisition moment of the second image is determined as the start moment of the swing operation.

In one embodiment, after obtaining images through the camera, the mobile terminal determines that the similarity between two adjacent frames of images is greater than the fourth threshold, and then a counter is added by 1. If the mobile terminal determines that the similarity between other two adjacent frames of images is also greater than the fourth threshold within a third preset duration, the counter is added by 1 again. If the accumulated value of the counter reaches a second preset value within a fourth preset duration, it is determined that swing stopping is detected, whereby the following frame of image in the two adjacent frames of images in which the counter reaches the second preset value is determined as the second image.

Based on the foregoing, the first image and the second image are determined, and then the swing direction and the swing amplitude of the swing operation may be further determined.

In one embodiment, the mobile terminal may determine the swing direction of the swing operation according to a displacement direction of matched feature points of the first image and the second image. In one embodiment, the value of the swing amplitude of the swing operation may be obtained by mapping according to the similarity between the first image and the second image.

In one embodiment, a corresponding relationship between the similarity and the swing amplitude may be preset in the mobile terminal. As the similarity is smaller, the swing amplitude is greater. The swing amplitude is negatively correlated with the similarity. When the mobile terminal determines the similarity between the first image and the second image, the swing amplitude corresponding to the current swing operation may be determined according to the corresponding relationship between the similarity and the swing amplitude.

Step 860: Determine the second virtual object based on the swing direction and the swing amplitude, and switch from the first virtual object in the locked state to the second virtual object to be in a locked state.

Similar to determining the second virtual object based on the swing direction and the swing acceleration in the above embodiment, it is also necessary to take the first virtual object as a reference position when determining the second virtual object based on the swing direction and the swing amplitude. When the first virtual object is a reference position in a virtual environment, the mobile terminal determines a second object number of candidate virtual objects in the swing direction in which the first virtual object is the reference position. The second object number may be represented by m, and m is a positive integer. When the second object number is equal to one (when the value of m is equal to one), the mobile terminal may directly determine a candidate virtual object in the swing direction as the second virtual object. When the second object number is greater than one (when the value of m is greater than one), it is further necessary to screen out the second virtual object from a plurality of candidate virtual objects. Correspondingly, the mobile terminal may determine the second virtual object from m candidate virtual objects in the swing direction based on the swing amplitude in the swing process.

In one embodiment, when the second object number is greater than one (when the value of m is greater than one), the mobile terminal sets m amplitude intervals corresponding to the swing direction. The mobile terminal determines a $p^{th}$ virtual object among the m virtual objects as the second virtual object when the swing amplitude is in a $p^{th}$ amplitude interval. The m candidate virtual objects correspond to m amplitude intervals one by one. The m candidate virtual objects are sorted in an ascending order according to distance from the first virtual object, and the m amplitude intervals are sorted in an ascending order according to amplitude value.

Schematically, the swing direction is left, and there are two candidate virtual objects on the left of the first virtual object. The mobile terminal sets two amplitude intervals corresponding to the left side as (0, 3) and (3, +∞), and determines the $1^{st}$ candidate virtual object on the left side of the first virtual object as the second virtual object based on the maximum value of the swing amplitude obtained by the similarity being 2.

In one embodiment, when the second object number is greater than one (when the value of m is greater than one), the mobile terminal obtains R preset amplitude intervals, and R is greater than m. Thereafter, an $r^{th}$ candidate virtual object among the m candidate virtual objects is determined as the second virtual object when the swing amplitude is in an $r^{th}$ amplitude interval and r is not greater than m. An $m^{th}$ candidate virtual object among the m candidate virtual objects is determined as the second virtual object when the swing amplitude is in the $r^{th}$ amplitude interval and r is greater than m. The m candidate virtual objects are sorted in an ascending order according to distance from the first virtual object, and the R amplitude intervals are sorted in an ascending order according to amplitude value.

The foregoing m, p, R, and r are all positive integers.

Schematically, when the value of m is 3, the mobile terminal obtains eight preset amplitude intervals: (0, 3), (3, 6), (6, 9), (9, 12), (12, 15), (15, 18), (18, 21), and (21, +∞) in sequence. The second candidate virtual object on the left side of the first virtual object is determined as the second virtual object if the swing amplitude in the swing process is 5 (falling within the second amplitude interval). The third candidate virtual object on the left side of the first virtual object is determined as the second virtual object if the swing amplitude in the swing process is 14 (falling within the fifth acceleration interval).

Based on the foregoing, the mobile terminal determines the second virtual object in the virtual environment. Thereafter, the mobile terminal displays that the virtual object in the locked state is switched from the first virtual object to the second virtual object, and the suitable display mode has been described in detail in step 260 and will not be repeated herein.

To sum up, it is determined that a swing operation has been received by a built-in camera of a mobile terminal, a swing direction and a swing amplitude of the swing operation are determined according to an image acquired by the camera, a second virtual object is determined according to the swing direction and the swing amplitude, and a virtual object in a locked state is switched from a first virtual object to the second virtual object finally, thus providing a specific implementation for switching locked objects according to the swing operation and ensuring the high efficiency of switching the locked objects.

In order to improve the efficiency of switching a locked target, FIG. 9 is a flowchart of a virtual object switching method according to an exemplary embodiment of the present disclosure. The method is exemplified by being applied to the mobile terminal 120 shown in FIG. 1. The method includes the following steps:

Step 910: Display a locking control in a second form.

The locking control in the second form is displayed on an interface of the mobile terminal. The locking control in the second form is configured to lock a virtual object among candidate virtual objects by a main control virtual object. With reference to FIG. 10(a), FIG. 10(a) shows a locking control 1001 in a second form. The locking control 1001 in the second form is schematically located in a lower right corner region of the interface of the mobile terminal, whereby a user quickly executes a locking operation.

Step 920: Display at least two virtual objects.

The at least two virtual objects include a first virtual object not in a locked state. With reference to FIG. 10(a), FIG. 10(a) shows five virtual objects in this case.

Step 930: Determine to execute a locking operation in response to a first trigger operation for the locking control in the second form.

In one embodiment, the first trigger operation includes at least one of a long-press trigger, a click/tap trigger, a double-click/tap trigger, a drag trigger, and a pressure trigger. Schematically, in response to the locking control 1001 in the second form in FIG. 10(a) receiving the first trigger operation, the mobile terminal determines to execute the locking operation.

Step 940: Display a first virtual object in a locked state when the first virtual object satisfies a locking condition.

In one embodiment, the operation of displaying a first virtual object in a locked state when the first virtual object satisfies a locking condition includes at least one of the following manners:

Determine a virtual object, closest to a main control virtual object, in the at least two virtual objects as the first virtual object in a virtual environment, and display the first virtual object in the locked state.

In one embodiment, the mobile terminal obtains a distance between each virtual object and the main control virtual object, determines a virtual object with the smallest distance as the first virtual object, executes the locking operation on the first virtual object, and correspondingly displays the first virtual object in the locked state.

Determine a virtual object, falling within an orientation of the main control virtual object, in the at least two virtual objects as the first virtual object in the virtual environment, and display the first virtual object in the locked state, the distance between the virtual object and the main control virtual object being smaller than a distance threshold.

In one embodiment, the mobile terminal obtains the distance between each virtual object and the main control virtual object, and compares a relationship between each distance and the distance threshold. A virtual object with the distance smaller than the distance threshold is screened out therefrom, and a virtual object oriented by the main control virtual object is further screened out therefrom as the first virtual object. The locking operation is executed on the virtual object to display the first virtual object in the locked state.

Determine a virtual object, having a minimum absolute biological value, in the at least two virtual objects as the first virtual object in the virtual environment, and display the first virtual object in the locked state, the distance between the virtual object and the main control virtual object being smaller than the distance threshold, the biological value being used for balancing a degree of wear of the virtual object in the virtual environment, and the absolute biological value being a remaining biological value of the virtual object.

In one embodiment, the mobile terminal obtains the distance between each virtual object and the main control virtual object, and compares a relationship between each distance and the distance threshold. A virtual object with the distance smaller than the distance threshold is first screened out, an absolute biological value of each virtual object is further obtained, and a virtual object with the minimum absolute biological value is determined as the first virtual object to execute the locking operation on the first virtual object.

Determine a virtual object, having a minimum relative biological value, in the at least two virtual objects as the first virtual object in the virtual environment, and display the first virtual object in the locked state, the distance between the virtual object and the main control virtual object being smaller than the distance threshold, and the relative biological value referring to a ratio of a remaining biological value of the virtual object to a complete biological value.

In one embodiment, the mobile terminal obtains the distance between each virtual object and the main control virtual object, and compares a relationship between each distance and the distance threshold. A virtual object with the distance smaller than the distance threshold is first screened out, a relative biological value of each virtual object is further obtained, and a virtual object with the minimum relative biological value is determined as the first virtual object to execute the locking operation on the first virtual object.

The relative biological value may be a ratio of the absolute biological value to a complete biological value. The absolute biological value is the remaining biological value of the virtual object.

With reference to FIG. 10, when the first virtual object satisfies the locking condition, a display interface of the mobile terminal is switched from FIG. 10(*a*) to FIG. 10(*b*), the first virtual object 31 is in the locked state, and the locking indicator 301 is displayed on the first virtual object 301 correspondingly.

Step 950: Display a locking control in a first form.

When the mobile terminal receives a first trigger operation on the locking control 1001 in the second form, the first virtual object 31 is locked in the at least two virtual objects, and the display interface of the mobile terminal is switched from FIG. 10(*a*) to FIG. 10(*b*). With reference to FIG. 10(*b*), the locking control 401 in the first form prompts the user that the virtual object in the locked state may be switched by the swing operation. FIG. 10(*b*) also shows a first virtual object 31, a second virtual object 32, and a locking indicator 301.

Step 960: Display a locking control in a third form.

After displaying the locking control in the first form for a preset duration, the locking control in the third form is displayed on the interface of the mobile terminal. The locking control in the third form is configured to unlock the first virtual object.

Schematically, FIG. 10(*c*) shows a locking control 302 in a third form.

If the mobile terminal receives a second trigger operation on the locking control 302 in the third form, the mobile terminal executes an unlocking operation, and the mobile terminal interrupts the execution of the virtual object switching method. If the mobile terminal does not receive the second trigger operation through the locking control 302 in the third form, the following step 970 is performed.

In one embodiment, the second trigger operation includes at least one of a long-press trigger, a click/tap trigger, a double-click/tap trigger, a drag trigger, and a pressure trigger.

Step 970: Display a first virtual object in a locked state and a second virtual object not in the locked state.

In one embodiment, the mobile terminal displays a first virtual object in a locked state and a second virtual object not in the locked state. In one embodiment, the second virtual object belongs to one of the at least two virtual objects in step 920.

Schematically, FIG. 10(*c*) shows a first virtual object 31 in a locked state and a second virtual object 32 not in the locked state. In this case, the second virtual object belongs to one of the at least two virtual objects in step 920.

Step 980: Receive a swing operation.

The swing operation is an operation for swinging a body of the mobile terminal.

In one embodiment, the mobile terminal receives the swing operation through a built-in motion sensor. The motion sensor may be an acceleration sensor, a gyro sensor, and a six-axis sensor (or a nine-axis sensor or a twelve-axis sensor) obtained by fusing the acceleration sensor and the gyro sensor.

In one embodiment, the mobile terminal determines that the swing operation has been received through an image acquired by a camera. Schematically, it is determined that the swing operation has been received through similarity between two adjacent frames of acquired images.

In one embodiment, the mobile terminal determines that the swing operation has been received through a signal received by an antenna. Schematically, the mobile terminal determines that the swing operation has been received through energy variation values of two adjacent signals received.

In one embodiment, the mobile terminal may receive the swing operation through other sensors, such as an optical sensor. It may be determined that the swing operation has been received through a light intensity variation caused by the swing operation. The swing operation may be received through a temperature sensor, a magnetic field sensor, and the like.

Step 990: Switch from the first virtual object in the locked state to the second virtual object to be in a locked state when the swing operation matches the second virtual object.

In one embodiment, the mobile terminal determines a second virtual object matched with the swing operation according to a swing direction of the swing operation obtained by the motion sensor and a maximum acceleration in a swing process. Thereafter, the mobile terminal displays that the virtual object in the locked state is switched from the first virtual object to the second virtual object.

In one embodiment, the mobile terminal determines that the swing operation has been received according to sudden variation of a waveform of the signal received by the antenna. The swing direction is determined according to a variation situation of the waveform after and before the sudden variation. A swing amplitude of the swing operation is determined according to an energy variation value of the signal before and after the sudden variation of the waveform. The mobile terminal determines the second virtual object according to the swing direction and the swing amplitude. Thereafter, the mobile terminal displays that the virtual object in the locked state is switched from the first virtual object to the second virtual object.

In one embodiment, the mobile terminal determines the swing direction and the swing amplitude of the swing operation according to an image acquired by the camera at a start moment of the swing operation and an image acquired at an end moment of the swing operation, and may further determine the second virtual object according to the swing direction and the swing amplitude. Thereafter, the mobile terminal displays that the virtual object in the locked state is switched from the first virtual object to the second virtual object.

Schematically, FIG. 10(*d*) shows a second virtual object 32 in a locked state. The locked state is switched from the first virtual object 31 to the second virtual object 32. A locking indicator is not displayed on the first virtual object 31. FIG. 10(*d*) also shows a prompt pattern 501 of a swing direction.

During the execution of step 970 to step 990 or after the execution of step 990, the mobile terminal may execute the unlocking operation in response to the locking control in the third form receiving the second trigger operation. After executing the unlocking operation, the mobile terminal stops switching the locked target.

To sum up, an interface of a mobile terminal is provided with a locking control in a first form (prompt information of a swing operation), a locking control in a second form (capable of executing a locking operation), and a locking control in a third form (capable of executing an unlocking operation), and is provided with prompt information of a swing direction, thus improving a specific implementation of the virtual object switching method and making the switching method closer to operation habits of users.

In order to improve the efficiency of switching a locked target, FIG. 11 shows a flowchart of a virtual object switching method according to an exemplary embodiment of the present disclosure. The method is exemplified by being applied to a smartphone. The method includes the following steps:

Step 1101: Start.

The smartphone starts to perform a switching process of locked targets.

Step 1102: Determine whether a user clicks/taps a target locking button on a main interface.

The smartphone determines whether the user clicks/taps the target locking button on the main interface. The target locking button is a button for actively locking a target character on the main interface. When the smartphone runs an application, the target locking button is provided in the lower right corner of a screen of the smartphone. Under normal circumstances, if there is no lockable target within a certain range from a player character, a trigger operation on the target locking button by the user will not work. If there is a lockable target within a certain range from the player character, the trigger operation on the target locking button by the user triggers locking.

If the user clicks/taps the target locking button on the main interface, step 1104 is performed. If the user does not click/tap the target locking button on the main interface, step 1103 is performed.

Step 1103: Skip performing target locking switching.

If the smartphone does not receive the trigger operation on the target locking button, the smartphone does not perform the target locking switching. In one embodiment, the trigger operation includes a long-press trigger, a click/tap trigger, a double-click/tap trigger, a drag trigger, a pressure trigger, and the like.

Step 1104: Determine whether there is a lockable target in a field of view.

If the smartphone receives the trigger operation on the target locking button, the smartphone determines whether there is a lockable target in the field of view of the player character. If there is a lockable target, step 1106 is performed. If there is no lockable target, step 1105 is performed.

Step 1105: Skip performing target locking.

The smartphone determines that there is no lockable target in the field of view of the player character, and the smartphone does not perform target locking. That is, the smartphone does not lock a virtual object in the field of view of the player character.

Step 1106: The number of targets meeting a locked state currently is greater than 1.

The smartphone determines whether the number of targets meeting the locked state in the field of view of the player character is greater than 1. If the number of targets meeting the locked state is greater than 1, the smartphone will start a thread for switching locked targets according to the swing operation. That is, the smartphone will then perform step 1108. If the number of targets meeting the locked state is equal to 1, the smartphone determines that the locked target cannot be switched currently. That is, the smartphone does not start the thread for switching locked targets according to the swing operation. That is, the smartphone will then start step 1107.

Step 1107: Skip starting an acceleration sensor.

The smartphone does not start the acceleration sensor.

Step 1108: Start the acceleration sensor.

Based on the number of targets meeting the locked state currently being greater than 1, the smartphone starts the acceleration sensor. The acceleration sensor may be configured to determine a swing direction and a swing acceleration of a subsequent swing operation.

Step 1109: Determine whether the smartphone swings.

The smartphone determines whether a swing operation is received. If yes, a swing direction of the swing operation is further determined. Otherwise, step 1110 is performed.

Step 1110: Skip performing target locking.

If the smartphone determines that the swing operation is not received, target locking is not performed.

Step 1111: A position after swinging is over a position before swinging.

After the smartphone determines that the swing operation occurs, the smartphone determines that the position after swinging is over the position before swinging (upward swing direction).

Step 1112: The position after swinging is on the left of the position before swinging.

After the smartphone determines that the swing operation occurs, the smartphone determines that the position after swinging is on the left of the position before swinging (leftward swing direction).

Step 1113: The position after swinging is on the right of the position before swinging.

After the smartphone determines that the swing operation occurs, the smartphone determines that the position after swinging is on the right of the position before swinging (rightward swing direction).

Step 1114: The position after swinging is under the position before swinging.

After the smartphone determines that the swing operation occurs, the smartphone determines that the position after swinging is under the position before swinging (downward swing direction).

Step 1115: Obtain a swing acceleration value of the smartphone.

The smartphone obtains the swing acceleration value. In one embodiment, the smartphone obtains a maximum value of a swing acceleration in a swing process through the acceleration sensor.

Step 1116: Determine an acceleration dynamic region where the swing acceleration is located.

The smartphone determines the acceleration dynamic region where the swing acceleration is located, and determines a switched locked target according to the acceleration dynamic region. In one embodiment, the smartphone determines an acceleration dynamic region matched with the maximum value of the swing acceleration according to the maximum value of the swing acceleration in the swing process. Optional, the smartphone presets a certain number of acceleration dynamic regions in advance, or the smartphone sets the same number of acceleration dynamic regions according to the number of virtual objects existing in the swing direction of the player character in a virtual environment.

Step 1117: Switch a locked target backwards.

When the position after swinging is over the position before swinging, the smartphone controls the locked target to be switched backwards.

Step 1118: Switch the locked target leftwards.

When the position after swinging is on the left of the position before swinging, the smartphone controls the locked target to be switched leftwards.

Step 1119: Switch the locked target rightwards.

When the position after swinging is on the right of the position before swinging, the smartphone controls the locked target to be switched rightwards.

Step 1120: Switch the locked target forwards.

When the position after swinging is under the position before swinging, the smartphone controls the locked target to be switched forwards.

Step 1121: Determine whether the user clicks/taps an unlocking button.

The smartphone determines whether the user clicks/taps the unlocking button. If the user clicks/taps the unlocking button, the smartphone stops switching the virtual object, closes locking logic of the application, and exits the locking process.

If the user clicks/taps the unlocking button, step 1122 is performed.

Step 1122: Turn off the acceleration sensor.

The smartphone exits the locking process and turns off the acceleration sensor.

FIG. 12 is a structural block diagram of a virtual object switching apparatus according to an exemplary embodiment of the present disclosure. The apparatus includes:

a display module 1201, configured to display a first virtual object in a locked state and a second virtual object not in the locked state, the locked state indicating a locked virtual object becoming an action target of a main control virtual object;

a receiving module 1202, configured to receive a swing operation, the swing operation being an operation for swinging a body of the mobile terminal; and a switching module 1203, configured to switch from the first virtual object in the locked state to the second virtual object to be in a locked state when the swing operation matches the second virtual object.

In an exemplary embodiment, the display module 1201 is further configured to display a locking indicator on the second virtual object, and cancel displaying the locking indicator on the first virtual object.

In an exemplary embodiment, the display module 1201 is further configured to display a locking visual effect on the second virtual object, and cancel displaying the locking visual effect on the first virtual object.

In an exemplary embodiment, the display module 1201 is further configured to display prompt information, the prompt information being used for indicating a swing direction of the swing operation, and the prompt information being in a form including at least one of graph, arrow, and text.

In an exemplary embodiment, the receiving module 1202 is further configured to obtain the swing direction and a swing acceleration of the swing operation through a motion sensor, the swing acceleration being a maximum acceleration in the process of the swing operation.

In an exemplary embodiment, the switching module 1203 is further configured to determine the second virtual object based on the swing direction and the swing acceleration, and switch from the first virtual object in the locked state to the second virtual object to be in a locked state.

In an exemplary embodiment, the switching module 1203 is further configured to:

determine a first object number of candidate virtual objects in the swing direction when the first virtual object is a reference position in a virtual environment;

determine the candidate virtual objects in the swing direction as the second virtual object when the first object number is equal to one; and determine the second virtual object from the candidate virtual objects in the swing direction based on the swing acceleration when the first object number is greater than one.

In an exemplary embodiment, the switching module 1203 is further configured to:

set n acceleration intervals in the swing direction when the first object number is greater than one, different acceleration intervals corresponding to positions of different candidate virtual objects; and determine, based on an $i^{th}$ acceleration interval in which the swing acceleration is located, a candidate virtual object in the $i^{th}$ acceleration interval as the second virtual object, i being a positive integer, the candidate virtual objects being sorted in an ascending order according to distance from the first virtual object, and the n acceleration intervals being sorted in an ascending order according to acceleration value.

In an exemplary embodiment, the switching module 1203 is further configured to:

obtain k preset acceleration intervals when the first object number is greater than one, k being greater than the first object number;

determine a $j^{th}$ candidate virtual object among the candidate virtual objects as the second virtual object when the swing acceleration is in a $j^{th}$ acceleration interval and j is not greater than the first object number; and determine an $n^{th}$ candidate virtual object among the candidate virtual objects as the second virtual object when the swing acceleration is in the $j^{th}$ acceleration interval and j is greater than the first object number, n being equal to the first object number, k and i being positive integers, the candidate virtual objects being sorted in an ascending order according to distance from the first virtual object, and the k acceleration intervals being sorted in an ascending order according to acceleration value.

In an exemplary embodiment, the receiving module 1202 is further configured to:

obtain a first position of the mobile terminal through the motion sensor, the first position being a position where the swing operation starts;

obtain a second position of the mobile terminal through the motion sensor, the second position being a position where the swing operation ends; and determine the swing direction of the swing operation based on the first position and the second position.

In an exemplary embodiment, the receiving module 1202 is further configured to:

determine a moment when an acceleration obtained through the motion sensor is greater than a first threshold as a start moment of the swing operation;

determine a moment when duration of the acceleration obtained through the motion sensor being smaller than a second threshold reaches a duration threshold as an end moment of the swing operation; and determine a maximum value of the acceleration between the start moment and the end moment as the swing acceleration.

In an exemplary embodiment, the receiving module 1202 is further configured to determine the swing direction and a swing amplitude of the swing operation through an image acquired by a camera.

In an exemplary embodiment, the switching module 1203 is further configured to determine the second virtual object based on the swing direction and the swing amplitude, and switch from the first virtual object in the locked state to the second virtual object to be in a locked state.

In an exemplary embodiment, the switching module 1203 is further configured to:

determine a second object number of candidate virtual objects in the swing direction when the first virtual object is a reference position in a virtual environment;

determine the candidate virtual objects in the swing direction as the second virtual object when the second object number is equal to one; and determine the second virtual object from the candidate virtual objects in the swing direction based on the swing amplitude when the second object number is greater than one.

In an exemplary embodiment, the receiving module 1202 is further configured to:

obtain a first image acquired by the camera, the first image being acquired by the camera at the start moment of the swing operation;

obtain a second image acquired by the camera, the second image being acquired by the camera at the end moment of the swing operation; and perform feature point matching based on the first image and the second image, and determine the swing direction of the swing operation.

In an exemplary embodiment, the receiving module 1202 is further configured to:

determine, when similarity between two adjacent frames of first images obtained by the camera is smaller than a third threshold, a previous frame in the two adjacent frames of first images as a first image;

determine, when similarity between two adjacent frames of second image obtained by the camera is greater than a fourth threshold, a following frame in the two adjacent frames of second image as a second image; and determine the swing amplitude of the swing operation based on similarity between the first image and the second image.

In an exemplary embodiment, the display module 1201 is further configured to display a locking control in a first form, the locking control in the first form being configured to prompt that virtual objects in the locked state are switched through the swing operation.

In an exemplary embodiment, the display module 1201 is further configured to display at least two virtual objects, the at least two virtual objects including a first virtual object not in the locked state.

In an exemplary embodiment, the display module 1201 is further configured to display the first virtual object in the locked state when the first virtual object satisfies a locking condition.

In an exemplary embodiment, the display module 1201 is further configured to:

determine a virtual object, closest to the main control virtual object, in the at least two virtual objects as the first virtual object, and display the first virtual object in the locked state;

determine a virtual object, falling within an orientation of the main control virtual object, in the at least two virtual objects as the first virtual object, and display the first virtual object in the locked state, the distance between the virtual object and the main control virtual object being smaller than a distance threshold;

determine a virtual object, having a minimum absolute biological value, in the at least two virtual objects as the first virtual object, and display the first virtual object in the locked state, the distance between the virtual object and the main control virtual object being smaller than the distance threshold, the absolute biological value referring to a remaining biological value of the virtual object, and the biological value being used for balancing a degree of wear of the virtual object in the virtual environment; and determine a virtual object, having a minimum relative biological value, in the at least two virtual objects as the first virtual object, and display the first virtual object in the locked state, the distance between the virtual object and the main control virtual object being smaller than the distance threshold, and the relative biological value referring to a ratio of a remaining biological value of the virtual object to a complete biological value.

In an exemplary embodiment, the display module 1201 is further configured to display a locking control in a second form.

In an exemplary embodiment, the display module 1201 is further configured to determine to execute a locking operation in response to a first trigger operation for the locking control in the second form.

In an exemplary embodiment, the display module 1201 is further configured to display a locking control in a third form.

In an exemplary embodiment, the display module 1201 is further configured to determine to execute an unlocking operation in response to a second trigger operation for the locking control in the third form.

To sum up, the apparatus may switch virtual objects in a locked state through a swing operation, thereby avoiding switching by touching a locking control repeatedly and enabling users to quickly switch locked targets. For example, when a main control virtual character controlled by a user is fighting fiercely with a first enemy character, the user finds that a second enemy character has a short fatal flaw. The second enemy character may be defeated so long as the main control virtual character attacks the second enemy character, and the user switches an originally locked virtual character (first enemy character) to the second enemy character through a swing operation, and attacks the second enemy character. Therefore, the swing operation is set to switch the locked target, thereby not only enriching the operation modes of the user, but also improving the efficiency of switching the locked target by the user and improving the strategy of games.

FIG. 13 shows a structural block diagram of a computer device 1300 according to an exemplary embodiment of the present disclosure. The computer device 1300 may be a portable mobile terminal, for example: a smartphone, a tablet personal computer, an MP3 player, an MP4 player, a laptop computer, or a desktop computer. The terminal device 1300 may also be referred to as another name such as a user equipment, a portable terminal, a laptop terminal, or a desktop terminal.

Generally, the computer device 1300 includes: a processor 1301 and a memory 1302.

The processor 1301 may include one or more processing cores, for example, a 4-core processor or an 8-core processor. The processor 1301 may be implemented in at least one hardware form of a digital signal processor (DSP), a field-programmable gate array (FPGA), and a programmable logic array (PLA). The processor 1301 may further include a main processor and a co-processor. The main processor is a processor for processing data in a wake-up status, and is also referred to as a central processing unit (CPU). The co-processor is a low-power processor for processing data in a standby status. In some embodiments, the processor 1301 may be integrated with a graphics processing unit (GPU). The GPU is responsible for rendering and drawing content to be displayed by a display screen. In some embodiments, the processor 1301 may further include an artificial intelligence (AI) processor. The AI processor is configured to process computing operations related to machine learning.

The memory 1302 may include one or more computer-readable storage media. The computer-readable storage medium may be non-transient. The memory 1302 may further include a high-speed random access memory and a nonvolatile memory, for example, one or more disk storage devices or flash storage devices. In some embodiments, the non-transitory computer-readable storage medium in the memory 1302 is configured to store at least one instruction. The at least one instruction is used for execution by the processor 1301 to implement the virtual object switching method according to the method embodiment of the present disclosure.

In some embodiments, the computer device 1300 may further include: a peripheral interface 1303 and at least one peripheral. The processor 1301, the memory 1302, and the peripheral interface 1303 may be connected through a bus or a signal cable. Each peripheral may be connected to the peripheral interface 1303 through a bus, a signal cable, or a circuit board. By way of example, the peripheral may include: a display screen 1304 and a camera assembly 1305.

In some embodiments, the computer device 1300 further includes one or more sensors 1306. The one or more sensors 1306 include, but are not limited to, an acceleration sensor, a gyro sensor, a pressure sensor, an optical sensor, and a proximity sensor.

It is to be understood by a person skilled in the art that the structure shown in FIG. 13 is not limiting of the computer device 1300 and may include more or fewer assemblies than illustrated, or some assemblies may be combined, or different assembly arrangements may be employed.

The present disclosure also provides a computer-readable storage medium. The storage medium stores at least one program. The at least one program is loaded and executed by a processor to implement the virtual object switching method according to the method embodiment.

The term module (and other similar terms such as sub-module, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The present disclosure provides a computer program product. The computer program product includes computer instructions. The computer instructions are stored in a computer-readable storage medium. A processor of a computer device reads the computer instructions from the computer-readable storage medium. The processor executes the computer instructions, whereby the computer device performs the virtual object switching method according to the method embodiment.

What is claimed is:

1. A virtual object switching method, performed by a mobile terminal, the method comprising:

displaying a first virtual object in a locked state and a second virtual object not in a locked state, the locked state indicating a locked virtual object becoming an action target of a main control virtual object;

obtaining, through a motion sensor, a swing direction and a swing acceleration of a swing operation, the swing operation including an operation for swinging a body of the mobile terminal, and the swing acceleration being a maximum acceleration during the swing operation;

determining a first object number of candidate virtual objects in the swing direction based on the first virtual object being a reference position in a virtual environment;

in response to the first object number being greater than one, determining the second virtual object from the candidate virtual objects in the swing direction based on an acceleration interval that the swing acceleration belongs and an order of the candidate virtual objects sorted according to distances from the first virtual object; and switching from the first virtual object in the locked state to the second virtual object to be in a locked state.

2. The method according to claim 1, wherein switching from the first virtual object in the locked state to the second virtual object to be in the locked state comprises at least one of following manners:

displaying a locking indicator on the second virtual object, and canceling displaying the locking indicator on the first virtual object;

displaying a locking visual effect on the second virtual object, and canceling displaying the locking visual effect on the first virtual object; or displaying prompt information, the prompt information indicating a swing direction of the swing operation, and the prompt information being in a form comprising at least one of graph, arrow, and text.

3. The method according to claim 1, further comprising:

determining the candidate virtual objects in the swing direction as the second virtual object in response to that the first object number is equal to one.

4. The method according to claim 1, wherein determining the second virtual object from the candidate virtual objects in the swing direction in response to that the first object number is greater than one comprises:

setting n acceleration intervals in the swing direction when the first object number is greater than one, different acceleration intervals corresponding to positions of different candidate virtual objects; and determining, based on an $i^{th}$ acceleration interval in which the swing acceleration is located, a candidate virtual object in the $i^{th}$ acceleration interval as the second virtual object, i being a positive integer, the candidate virtual objects being sorted in an ascending order according to a distance from the first virtual object, and the n acceleration intervals being sorted in an ascending order according to an acceleration value.

5. The method according to claim 1, wherein determining the second virtual object from the candidate virtual objects in the swing direction in response to that the first object number is greater than one comprises:

obtaining k preset acceleration intervals when the first object number is greater than one, k being greater than the first object number;

determining a $j^{th}$ candidate virtual object among the candidate virtual objects as the second virtual object when the swing acceleration is in a $j^{th}$ acceleration interval and j is not greater than the first object number; and determining an $n^{th}$ candidate virtual object among the candidate virtual objects as the second virtual object when the swing acceleration is in the $j^{th}$ acceleration interval and j is greater than the first object number, n being equal to the first object number, k and i being positive integers, the candidate virtual objects being sorted in an ascending order according to a distance from the first virtual object, and the k acceleration intervals being sorted in an ascending order according to an acceleration value.

6. The method according to claim 1, wherein obtaining the swing direction of the swing operation through the motion sensor comprises:

obtaining a first position of the mobile terminal through the motion sensor, the first position being a position where the swing operation starts;

obtaining a second position of the mobile terminal through the motion sensor, the second position being a position where the swing operation ends; and determining the swing direction of the swing operation based on the first position and the second position.

7. The method according to claim 1, wherein obtaining the swing acceleration of the swing operation through the motion sensor comprises:

determining a moment when an acceleration obtained through the motion sensor is greater than a first threshold as a start moment of the swing operation;

determining a moment when duration of the acceleration obtained through the motion sensor being smaller than a second threshold reaches a duration threshold as an end moment of the swing operation; and determining a maximum value of the acceleration between the start moment and the end moment as the swing acceleration.

8. The method according to claim 1, further comprising:

displaying a locking control in a first form, the locking control in the first form being configured to prompt that virtual objects in the locked state are switched through the swing operation.

9. The method according to claim 1, further comprising:

displaying at least two virtual objects, the at least two virtual objects comprising a first virtual object not in the locked state; and displaying the first virtual object in the locked state when the first virtual object satisfies a locking condition.

10. The method according to claim 9, wherein displaying the first virtual object in the locked state when the first virtual object satisfies the locking condition comprises at least one of following manners:

determining a virtual object, closest to the main control virtual object, in the at least two virtual objects as the first virtual object, and displaying the first virtual object in the locked state;

determining a virtual object, falling within an orientation of the main control virtual object, in the at least two virtual objects as the first virtual object, and displaying the first virtual object in the locked state, a distance between the virtual object and the main control virtual object being smaller than a distance threshold;

determining a virtual object, having a minimum absolute biological value, in the at least two virtual objects as the first virtual object, and displaying the first virtual object in the locked state, the distance between the virtual object and the main control virtual object being smaller than the distance threshold, the absolute biological value referring to a remaining biological value of the virtual object, and the biological value being used for balancing a degree of wear of the virtual object in the virtual environment; and determining a virtual object, having a minimum relative biological value, in the at least two virtual objects as the first virtual object, and displaying the first virtual object in the locked state, the distance between the virtual object and the main control virtual object being smaller than the distance threshold, and the relative biological value referring to a ratio of a remaining biological value of the virtual object to a complete biological value.

11. The method according to claim 9, further comprising:
displaying a locking control in a second form; and
determining to execute a locking operation in response to a first trigger operation for the locking control in the second form.

12. The method according to claim 1, further comprising:
displaying a locking control in a third form; and
determining to execute an unlocking operation in response to a second trigger operation for the locking control in the third form.

13. A computer device, comprising: a processor and a memory, the memory storing a computer program, and the computer program being loaded and executed by the processor to implement the virtual object switching method according to claim 1.

14. A virtual object switching method, performed by a mobile terminal, the method comprising:
displaying a first virtual object in a locked state and a second virtual object not in a locked state, the locked state indicating a locked virtual object becoming an action target of a main control virtual object;
determining a swing direction and a swing amplitude of a swing operation through an image acquired by a camera, the swing operation including an operation for swinging a body of the mobile terminal;
determining the second virtual object based on the swing direction and the swing amplitude; and
switching from the first virtual object in the locked state to the second virtual object to be in the locked state.

15. The method according to claim 14, wherein determining the second virtual object based on the swing direction and the swing amplitude comprises:
determining a second object number of candidate virtual objects in the swing direction when the first virtual object is a reference position in a virtual environment;
determining the candidate virtual objects in the swing direction as the second virtual object when the second object number is equal to one; and
determining the second virtual object from the candidate virtual objects in the swing direction based on the swing amplitude when the second object number is greater than one.

16. The method according to claim 14, wherein determining the swing direction of the swing operation through the image acquired by the camera comprises:

obtaining a first image acquired by the camera, the first image being acquired by the camera at the start moment of the swing operation;
obtaining a second image acquired by the camera, the second image being acquired by the camera at the end moment of the swing operation; and
performing feature point matching based on the first image and the second image, and determining the swing direction of the swing operation.

17. The method according to claim 14, wherein determining the swing amplitude of the swing operation through the image acquired by the camera comprises:
determining, when similarity between two adjacent frames of first images obtained by the camera is smaller than a third threshold, a previous frame in the two adjacent frames of first images as a first image;
determining, when similarity between two adjacent frames of second image obtained by the camera is greater than a fourth threshold, a following frame in the two adjacent frames of second image as a second image; and
determining the swing amplitude of the swing operation based on similarity between the first image and the second image.

18. A computer device, comprising: a processor and a memory, the memory storing a computer program, and the computer program being loaded and executed by the processor to implement the virtual object switching method according to claim 14.

19. A non-transitory computer-readable storage medium for storing a computer program, the computer program being loaded and executed by a processor to implement the virtual object switching method according to claim 14.

20. A non-transitory computer-readable storage medium for storing a computer program, the computer program being loaded and executed by a processor to implement:
displaying a first virtual object in a locked state and a second virtual object not in a locked state, the locked state indicating a locked virtual object becoming an action target of a main control virtual object;
obtaining, through a motion sensor, a swing direction and a swing acceleration of a swing operation, the swing operation including an operation for swinging a body of the mobile terminal, and the swing acceleration being a maximum acceleration during the swing operation;
determining a first object number of candidate virtual objects in the swing direction based on the first virtual object being a reference position in a virtual environment;
in response to the first object number being greater than one, determining the second virtual object from the candidate virtual objects in the swing direction based on an acceleration interval that the swing acceleration belongs and an order of the candidate virtual objects sorted according to distances from the first virtual object; and
switching from the first virtual object in the locked state to the second virtual object to be in a locked state.

* * * * *